(12) United States Patent
Yeung et al.

(10) Patent No.: US 10,102,236 B2
(45) Date of Patent: Oct. 16, 2018

(54) METHOD AND SYSTEM FOR PROVIDING BUSINESS INTELLIGENCE DATA

(71) Applicant: pVelocity Inc., Toronto (CA)

(72) Inventors: Vivien Yeung, Toronto (CA); Kang Lu, Toronto (CA); Michael Lee, Toronto (CA); Bill Parousis, Toronto (CA); Keling Zhang, Toronto (CA)

(73) Assignee: pVelocity Inc., Toronto (CA)

( * ) Notice: Subject to any disclaimer, the term of this patent is extended or adjusted under 35 U.S.C. 154(b) by 598 days.

(21) Appl. No.: 13/676,633

(22) Filed: Nov. 14, 2012

(65) Prior Publication Data

US 2013/0124241 A1 May 16, 2013

Related U.S. Application Data

(60) Provisional application No. 61/559,929, filed on Nov. 15, 2011.

(51) Int. Cl.
*G06F 17/30* (2006.01)
*G06Q 10/06* (2012.01)

(52) U.S. Cl.
CPC .. *G06F 17/30339* (2013.01); *G06F 17/30333* (2013.01); *G06F 17/30539* (2013.01);
(Continued)

(58) Field of Classification Search
CPC combination set(s) only.
See application file for complete search history.

(56) References Cited

U.S. PATENT DOCUMENTS 6,049,797 A * 4/2000 Guha ............... G06F 17/30598
6,601,062 B1 * 7/2003 Deshpande ....... G06F 17/30457
(Continued)

OTHER PUBLICATIONS

Zhang et al., Dynamic On-Line Updating Solution for CURE Cubes, 2008, IEEE Computer Society, p. 396-400 (Year: 2008).*
(Continued)

*Primary Examiner* — Ivan R Goldberg
*Assistant Examiner* — Crystol Stewart
(74) *Attorney, Agent, or Firm* — McMillan LLP

(57) ABSTRACT

A computer implemented method for data mining and providing business intelligence data including generating by an analytics server one or more dimensions from source data imported from a computer readable medium, wherein the one or more dimensions define categories into which portions of the normalized data can be grouped; generating by the analytics server one or more measures from the source data linked to the one or more dimensions; storing by the analytics server the one or more dimensions and the one or more measures in a plurality of tables arranged in one of a snowflake and a star schema; determining by the analytics server relationship information between one or more measures and one or more dimensions in each of the plurality of tables; storing by the analytics server the relationship information on the computer readable medium; calculating by the analytics server a total cost of at least one product based on the relationship information; and, querying by a computer system in communication with the analytics server for the change in total cost of the at least one product based on a change in any one of the measures.

10 Claims, 24 Drawing Sheets

(52) U.S. Cl.
CPC .. *G06F 17/30592* (2013.01); *G06F 17/30598* (2013.01); *G06F 17/30864* (2013.01); *G06Q 10/06* (2013.01); *G06Q 10/063* (2013.01)

(56) References Cited

U.S. PATENT DOCUMENTS

| | | | | |
|---|---|---|---|---|
| 6,775,647 | B1* | 8/2004 | Evans | G06Q 30/06 700/97 |
| 7,072,891 | B2* | 7/2006 | Lee | G06K 9/6218 |
| 7,269,595 | B1* | 9/2007 | Loboz | G06F 17/30339 707/803 |
| 7,337,149 | B2* | 2/2008 | Blouin | G06Q 30/0283 700/121 |
| 8,214,238 | B1* | 7/2012 | Fairfield | G06Q 10/063 705/7.11 |
| 8,311,975 | B1* | 11/2012 | Gonsalves | G06F 17/30592 707/606 |
| 8,364,723 | B1* | 1/2013 | Hseush | G06F 17/30592 707/758 |
| 2002/0029207 | A1* | 3/2002 | Bakalash | G06F 17/30457 |
| 2002/0133368 | A1* | 9/2002 | Strutt | G06F 17/30592 705/7.11 |
| 2002/0156792 | A1* | 10/2002 | Gombocz | G06F 17/30286 |
| 2003/0144868 | A1* | 7/2003 | MacIntyre | G06F 17/30536 705/7.38 |
| 2003/0150908 | A1* | 8/2003 | Pokorny | B23Q 35/12 235/375 |
| 2004/0059705 | A1* | 3/2004 | Wittke | G06N 5/00 |
| 2004/0122646 | A1* | 6/2004 | Colossi | G06F 17/30592 703/22 |
| 2004/0122844 | A1* | 6/2004 | Malloy | G06F 17/30592 |
| 2004/0139061 | A1* | 7/2004 | Colossi | G06F 17/30592 |
| 2004/0243593 | A1* | 12/2004 | Stolte | G06F 17/30592 |
| 2005/0076045 | A1* | 4/2005 | Stenslet | G06F 17/30592 |
| 2005/0246357 | A1* | 11/2005 | Geary | G06F 17/30592 |
| 2005/0289166 | A1* | 12/2005 | Stanley | G06F 17/30286 |
| 2006/0149407 | A1* | 7/2006 | Markham | B23Q 35/12 700/108 |
| 2007/0027904 | A1* | 2/2007 | Chow et al. | 707/102 |
| 2007/0227904 | A1* | 10/2007 | Miller | B01D 61/422 205/742 |
| 2008/0172405 | A1* | 7/2008 | Feng | G06F 17/30592 |
| 2011/0040744 | A1* | 2/2011 | Haas | G06F 17/30445 707/713 |
| 2013/0151491 | A1* | 6/2013 | Gislason | G06F 17/30563 707/696 |
| 2017/0024421 | A1* | 1/2017 | Kim | G06F 17/30563 |

OTHER PUBLICATIONS

Chaudhuri et al., Database Technology for Decision Support Systems, Dec. 2001, IEEE, p. 48-55 (Year: 2001).*

* cited by examiner

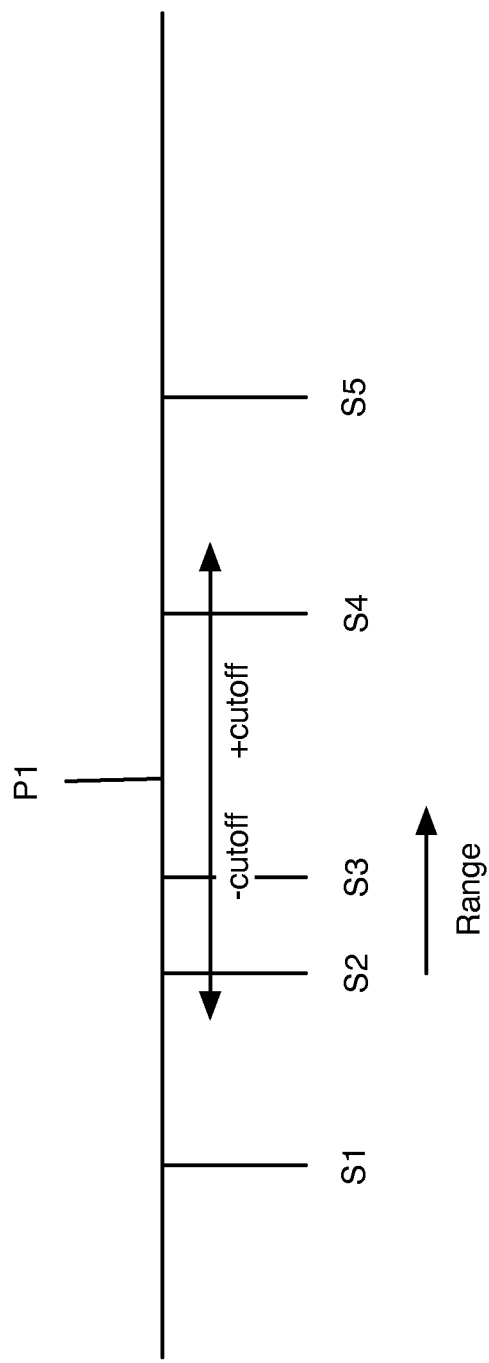

| PV_MaterialID | PlantID | MaterialID | MaterialName | MaterialDescription | MaterialType | MaterialUOM |
|---|---|---|---|---|---|---|
| 1 | BA_023045 | BA | 023045 | DIETHANOLAMINE | NULL | NULL | LB |
| 2 | BA_023713 | BA | 023713 | COCONUT OIL HYDROGENATED | NULL | NULL | LB |
| 3 | BA_023715 | BA | 023715 | COCONUT OIL 76 RBD (REFINED) | NULL | NULL | LB |
| 4 | BA_026725 | BA | 026725 | POTASSIUM HYDROXIDE FLAKE 90% | NULL | NULL | LB |
| 5 | BA_065577 | BA | 065577 | 55USG/45GAL O/H HDPE DRUM BLUE | NULL | NULL | LB |
| 6 | BA_111655 | BA | 111655 | SODACIDE-C D051B BULK | NULL | NULL | LB |
| 7 | BA_111677 | BA | 111677 | SODACIDE-C D051B 450 OHP | NULL | NULL | LB |

Figure 19

| PlantID | PV_ActivityID | PV_MaterialID | MaterialQty | WeightFactor | MaterialUOM |
|---|---|---|---|---|---|
| BA | BA_BA333400_BI | BA_111655 | 4500.000000 | 0 | 1 |
| BA | BA_BA333488_BI | BA_111677 | 20000.000000 | 0 | 1 |

Figure 20

| PV_ActivityID | PlantID | ActivityID | ActivityName | ActivityDescription | Duration | PV_Constraint | ActivityUnit |
|---|---|---|---|---|---|---|---|
| 1 | BA_BA333400_BI | BA | BA333400_BI | BA333400_BI | BA333400_BI | 0.000000 | 0 | NULL |
| 2 | BA_BA333488_BI | BA | BA333488_BI | BA333488_BI | BA333488_BI | 0.000000 | 0 | NULL |

Figure 21

| | PV_ActivityID | PV_ResourceID | Duration | PV_Constraint |
|---|---|---|---|---|
| 1 | BA_BA333400_BI | BA_10007 | 8.000000 | 1 |
| 2 | BA_BA333400_BI | BA_CORPBA | 9.000000 | 1 |
| 3 | BA_BA333488_BI | BA_10099 | 2.000000 | 1 |

Figure 22

| | PV_ResourceID | PlantID | ResourceID | ResourceName | ResourceDescription | Capacity | ResourceType |
|---|---|---|---|---|---|---|---|
| 1 | BA_10007 | BA | 10007 | REACTOR 3000 | | 10.000000 | NULL |
| 2 | BA_10099 | BA | 10099 | DRUM | | 10.000000 | NULL |
| 3 | BA_CORPBA | BA | CORPBA | CATCHALL | | 10.000000 | NULL |

Figure 23

| | PV_MaterialID | MeasureID | MeasureFunction | Measure |
|---|---|---|---|---|
| 1 | BA_023045 | S_MatCost | 2 | 0.858675 |
| 2 | BA_023713 | S_MatCost | 2 | 0.486010 |
| 3 | BA_023715 | S_MatCost | 2 | 0.465974 |
| 4 | BA_026725 | S_MatCost | 2 | 0.801430 |
| 5 | BA_065577 | S_MatCost | 2 | 26.138067 |

Figure 24

| PV_ResourceID | MeasureID | MeasureFunction | Measure |
|---|---|---|---|
|  |  |  |  |
| BA_10007 | S_ActivityDuration | 7 | 1.000000 |
| BA_10007 | S_DepCost | 8 | 27.500000 |
| BA_10007 | S_FixedOHCost | 8 | 70.000000 |
| BA_10007 | S_LaborCost | 8 | 80.000000 |
| BA_10007 | S_ResourceDuration | 8 | 1.000000 |
| BA_10007 | S_VarOHCost | 8 | 72.000000 |
| BA_10099 | S_ActivityDuration | 7 | 1.000000 |
| BA_10099 | S_DepCost | 8 | 100.000000 |
| BA_10099 | S_FixedOHCost | 8 | 100.000000 |
| BA_10099 | S_LaborCost | 8 | 100.000000 |
| BA_10099 | S_ResourceDuration | 8 | 1.000000 |
| BA_10099 | S_VarOHCost | 8 | 100.000000 |
| BA_CORPBA | S_ActivityDuration | 7 | 1.000000 |
| BA_CORPBA | S_DepCost | 8 | 3.500000 |
| BA_CORPBA | S_FixedOHCost | 8 | 3.500000 |
| BA_CORPBA | S_LaborCost | 8 | 3.500000 |
| BA_CORPBA | S_ResourceDuration | 8 | 1.000000 |
| BA_CORPBA | S_VarOHCost | 8 | 3.500000 |

Figure 25

| MeasureFuncti... | MeasureClassName | MeasureArg1 | MeasureArg2 |
|---|---|---|---|
| 1 | com.pvelocity.rpm.calc.ConstantMeasure | | |
| 2 | com.pvelocity.rpm.calc.QuantityRateMeasure | | |
| 7 | com.pvelocity.rpm.calc.ActivityDurationMeasure | NULL | NULL |
| 8 | com.pvelocity.rpm.calc.DurationRateMeasure | NULL | NULL |
| * | NULL | NULL | NULL |

Figure 26

Product: BA_111677     Stock Transfer

| Material | Material Name | Quantity Lb | Mat'l Cost $/Lb | Mat'l Cost $ | Equipment Cost $/Lb | Equipment Cost $ | Activity | Is Constant | Batch Size Lb | Duration Hr | Carried Time Hr |
|---|---|---|---|---|---|---|---|---|---|---|---|
| BA_111677 | SODA/DEO DD 19,460 CHP | 19,900 | 1.1673 | 23,231.22 | 0.2239 | 5,965.29 | BA BA333BB_BI | ✓ | 1,500 | 2.00 | 2.49 |
| BA 085577 | 55USGAL/GAL OH HDPE DRUM BLUE | 42 | 26.1381 | 1,096.70 | 0.0300 | 0.00 | BA BA333400 BI | ✓ | 20,000 | 17.00 | 16.07 |
| ⊟ BA 111855 | SODA/DE-C DD 51B BULK | 18,900 | 0.5892 | 11,136.57 | 0.1061 | 2,005.29 | | □ | 0 | 0.00 | 0.00 |
| BA 023045 | DIETHANOLAMINE | 6,586 | 0.8587 | 5,225.72 | 0.0000 | 0.00 | | □ | 0 | 0.00 | 0.00 |
| BA 023713 | COCONUT OIL HYDROGENATED | 0 | 0.4860 | 0.00 | 0.0000 | 0.00 | | □ | 0 | 0.00 | 0.00 |
| BA 023715 | COCONUT OIL 76 RBD (REFINED) | 12,557 | 0.4660 | 5,865.49 | 0.0000 | 0.00 | | □ | 0 | 0.00 | 0.00 |
| BA 028725 | POTASSIUM HYDROXIDE FLAKE 90% | 57 | 0.8014 | 45.44 | 0.0000 | 0.00 | | □ | 0 | 0.00 | 0.00 |

Mat'l Cost $/Lb: 0.5473    Production Speed Lb/Hr: 773    ☑ Constant Throughput

Figure 27

METHOD AND SYSTEM FOR PROVIDING BUSINESS INTELLIGENCE DATA

FIELD OF THE INVENTION

The present invention relates generally to a method and system for providing business intelligence data, and more particularly to a method and system for improving the efficiency in which data is accessed and tabulated after in a change in a portion of the data.

BACKGROUND OF THE INVENTION

Business intelligence is a set of methodologies, processes, architectures, and technologies that transform raw data into meaningful and useful information used to enable more effective strategic, tactical, and operational insights and decision-making for an organization. Better decision-making is the driver for business intelligence. Generally, the process of providing business intelligence data starts with the determination of what kinds of summaries and reports a user may be interested in. Key business users are queried to determine the types of reports and summaries that they may be interested in. Due to the amount of resources required to effect changes in the types of reports and summaries that are generated, significant care is taken in designing these reports and summaries.

Once the required reports and summaries have been identified, the data required to generate these summaries and reports is determined. The data is typically stored by one or more Enterprise Information Systems ("EISes"), such as an Enterprise Resource Planning ("ERP") system. These EISes are referred to herein as "source systems". The particular location of the data in the source systems is noted, and extraction functions are coded to extract the data from the specific locations. In general, the goal of the extraction phase is to convert the data into a single format that is appropriate for transformation processing. Thus, the extraction functions not only retrieve the data from the source systems, but they parse and align the data with other data from the same or other source systems. As extraction functions have to be manually coded and tested for the data from each specific location, this step can be lengthy.

Transformation functions are then designed to transform and structure the data extracted from the source system(s) to enable rapid generation of the desired summaries and reports. The transform stage applies a series of rules or functions to the data extracted from the source system(s) to derive the data for loading into the end target. Some data sources require very little or even no manipulation of data. In other cases, one or more transformations may be required to be applied to the extracted data to meet the business and technical needs of a target database that is used to generate reports and summaries. Depending on the amount of transforming, the design and testing of the transformation functions can be a lengthy procedure.

Transformed data is then loaded into an end target, typically a data warehouse, that can be queried by users via business intelligence clients. Depending on the requirements of the organization, this process varies widely. Some data warehouses may overwrite existing information with cumulative information, frequently updating extract data is done on daily, weekly or monthly basis. Other data warehouses (or even other parts of the same data warehouse) may add new data in a historicized form, for example, hourly.

This process of providing business intelligence data is very manually intensive and requires significant expertise. The entire process typically takes from two to six months. Further, changes to the structure and/or format of the data in the source systems to be extracted can require significant manual recoding of the extraction functions. Further, changes to the information desired from the summaries and reports can require significant recoding of the extraction, transformation and load functions. As this is generally performed manually, the effort required can be substantial and is very sensitive to human error.

Accordingly, it is an object of the invention to provide a novel method and system for providing business intelligence data.

SUMMARY OF THE INVENTION

According to one embodiment of the invention, there is provided a system for data mining and providing business intelligence data comprising an analytics server including a computer readable medium having a data file stored thereon, the data file consisting of the data aggregated from one or more data sources in the form of source data; wherein the analytics server includes computer readable instructions stored on the computer readable medium for: generating one or more dimensions from the source data, wherein the one or more dimensions define categories into which portions of the normalized data can be grouped; generating one or more measures from the source data linked to the one or more dimensions; storing the one or more dimensions and the one or more measures in a plurality of tables arranged in one of a snowflake and a star schema; determining relationship information between one or more measures and one or more dimensions in each of the plurality of tables; storing the relationship information on the computer readable medium; calculating a total cost of at least one product based on the relationship information; one or more computing devices in communication with the analytics server, and including a module stored on a further computer readable medium having instructions thereon for: querying and receiving data from the analytics server, wherein the querying comprises querying for the change in total cost of the at least one product based on a change in any one of the measures.

According to an aspect of this embodiment, the step of determining relationship information comprises determining relationship information between any one of the one or more measures and an additional any one of the one or more measures selected from the one or more measures linked to the same dimension.

According to another aspect, the step of determining relationship information comprises determining relationship information between any one of the one or more measures and an additional any one of the one or more measures selected from one or more measures linked to a different dimension.

According to another aspect, the step of determining relationship information comprises determining a plurality of relationships between any one or more of the measures and dimensions.

According to another aspect, each of the plurality of tables contains one or more dimensions and measures related to a component or process required to produce an end product.

According to another aspect, each of the plurality of tables has a cost associated therewith, wherein the cost is a percentage of a total cost required to produce the end product.

According to another aspect, the relationship information includes each the costs, and the computer readable instructions further include storing the costs in a costs table.

According to another aspect, the computer readable instructions further includes instructions for responding to a query by the one or more computing devices by determining a total product cost based on an identified change in one or more measures and the percentage of the total cost as stored in the costs table.

In another embodiment of the invention, there is provided a computer implemented method for data mining and providing business intelligence data including generating by an analytics server one or more dimensions from source data imported from a computer readable medium, wherein the one or more dimensions define categories into which portions of the normalized data can be grouped; generating by the analytics server one or more measures from the source data linked to the one or more dimensions; storing by the analytics server the one or more dimensions and the one or more measures in a plurality of tables arranged in one of a snowflake and a star schema; determining by the analytics server relationship information between one or more measures and one or more dimensions in each of the plurality of tables; storing by the analytics server the relationship information on the computer readable medium; calculating by the analytics server a total cost of at least one product based on the relationship information; and, querying by a computer system in communication with the analytics server for the change in total cost of the at least one product based on a change in any one of the measures.

According to one aspect, the step of determining relationship information comprises determining relationship information between any one of the one or more measures and an additional any one of the one or more measures selected from the one or more measures linked to the same dimension.

According to another aspect, the step of determining relationship information comprises determining relationship information between any one of the one or more measures and an additional any one of the one or more measures selected from one or more measures linked to a different dimension.

According to another aspect, the step of determining relationship information comprises determining a plurality of relationships between any one or more of the measures and dimensions.

According to another aspect, each of the plurality of tables contains one or more dimensions and measures related to a component or process required to produce an end product.

According to another aspect, each of the plurality of tables has a cost associated therewith, wherein the cost is a percentage of a total cost required to produce the end product.

According to another aspect, the relationship information includes each the costs, and the computer readable instructions further include storing the costs in a costs table.

According to another aspect, the method includes responding by the analytics server to a query by the one or more computing devices by determining a total product cost based on an identified change in one or more measures and the percentage of the total cost as stored in the costs table.

BRIEF DESCRIPTION OF THE DRAWINGS

Embodiments will now be described, by way of example only, with reference to the attached Figures, wherein:

FIG. 11 shows an exemplary timeline illustrating the determination of revenue for a material in a production transaction by the analytics server of FIG. 1;

FIG. 17 shows a bill of materials screen presented by the business intelligence client of FIG. 4 using data processed by the analytics server;

FIG. 18 shows a portion of the corresponding table containing the parent and child relationships for the materials shown in FIG. 17;

FIG. 19 shows a portion of a material table corresponding to the materials of FIG. 17;

FIG. 20 shows a portion of the material-activity table corresponding to the materials of FIG. 17;

FIG. 21 shows a portion of the activity table corresponding to the materials of FIG. 17;

FIG. 22 shows a portion of the activity-resource table corresponding to the materials of FIG. 17;

FIG. 23 illustrates a portion of the resource table corresponding to the materials of FIG. 17;

FIG. 24 shows a portion of the material-measure table corresponding to the materials of FIG. 17;

FIG. 25 shows a portion of the resource-measure table corresponding to the materials of FIG. 17;

FIG. 26 illustrates a portion of the measure-function table corresponding to the materials of FIG. 17; and FIG. 27 shows a BOM screen generated by the business intelligence client of FIG. 4 showing material costs.

DETAILED DESCRIPTION OF THE EMBODIMENTS

Embodiments of the invention related generally to a method and system for determining the overall cost of a product or service, or the change in the overall cost, when one sub-cost has changed. Prior art methods required a recalculation of the total cost resulting in a loss of efficiency and using unnecessary time and resources. The invention permits for determining the overall cost by accounting for the impact of various sub-costs, storing this impact using the system claimed such that when there is a change in the sub-cost, the change in the overall cost is known. This is true in the case where sub-costs are changing in disproportionate amounts compared to other sub-costs as well, as will become evident in view of the description that follows.

Figure 1:
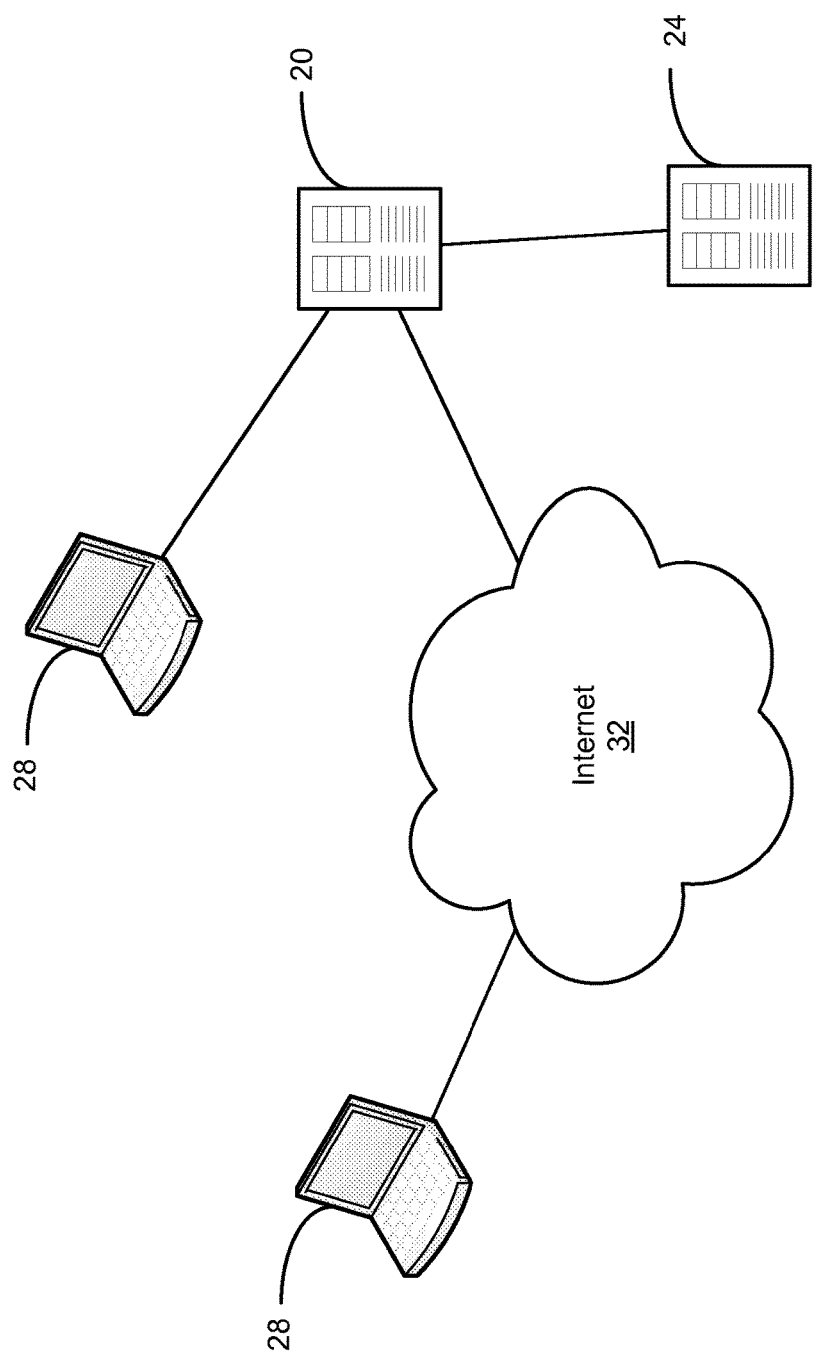
FIG. 1 shows a high-level architecture of an analytics server for providing business intelligence data in accordance with an embodiment of the invention and its operating environment.

An analytics server 20 for providing business intelligence data and its operating environment is shown in FIG. 1. In particular, the analytics server 20 is a computer system that is configured to extract, transform and load data from a source system 24 to which it is coupled. The source system 24 in this embodiment is an ERP system that integrates internal and external management information across an entire organization. It will be appreciated, however, that the invention can be used with other source systems, such as customer relationship management systems, manufacturing execution systems, etc. The source system 24 ties together finance/accounting, manufacturing, sales and service, customer relationship management, etc., automating this activity with an integrated software application. Its purpose is to facilitate the flow of information between all business functions inside the boundaries of the organization and manage the connections to outside stakeholders, such as suppliers, distributors, customers, etc. The source system 24 operates in real time or next-to-real time, and includes a common database that aggregates all data across all internal and outside stakeholder systems.

One or more client computing devices 28 are in communication with the analytics server 20, either directly or over a large communications network, such as the Internet 32. Client computing devices 28 may be desktop computers, notebook computers, mobile devices with embedded operating systems, etc. While, in this particular embodiment, the Internet 32 is shown, any other communications network enabling communications between the various devices can be substituted. The client computing devices 28 are personal computers that execute a business intelligence client for connecting to, querying and receiving response data from the analytics server 20.

Figure 2:
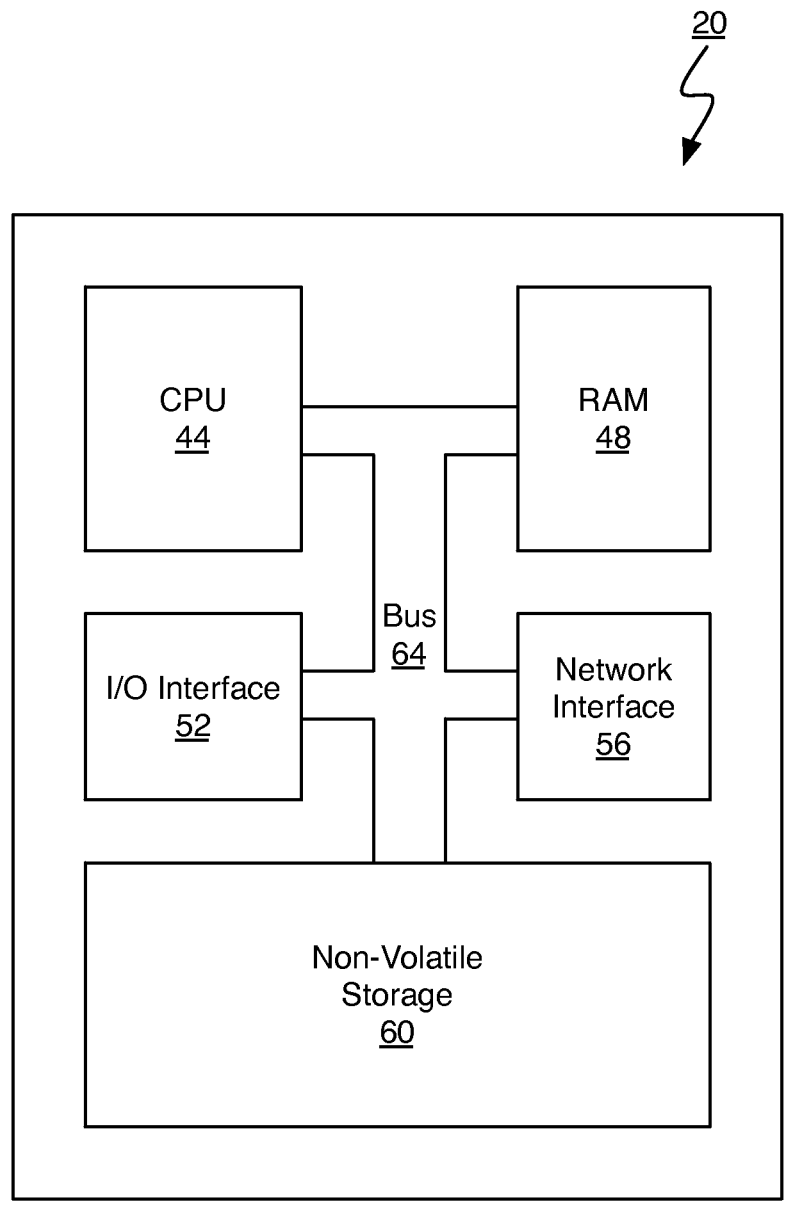
FIG. 2 shows a schematic diagram of the analytics server of FIG. 1.

FIG. 2 shows various physical elements of the analytics server 20. As shown, the analytics server 20 has a number of physical and logical components, including one or more central processing units 44 (referred to hereinafter as "CPU"), random access memory ("RAM") 48, an input/output ("I/O") interface 52, a network interface 56, non-volatile storage 60, and a local bus 64 enabling the CPU 44 to communicate with the other components. The CPU 44 executes an operating system, an analytics engine, and two business intelligence applications. RAM 48 provides relatively-responsive volatile storage to the CPU 44. The I/O interface 52 allows for input to be received from one or more devices, such as a keyboard, a mouse, etc., and outputs information to output devices, such as a display and/or speakers. The network interface 56 permits communication with other computing devices. Non-volatile storage 60 stores the operating system and programs, including computer-executable instructions for implementing the analytics engine and the business intelligence applications, as well as data being processed by both. During operation of the analytics server 20, the operating system, the programs and the data may be retrieved from the non-volatile storage 60 and placed in RAM 48 to facilitate execution.

Data Modeling

Figure 3:
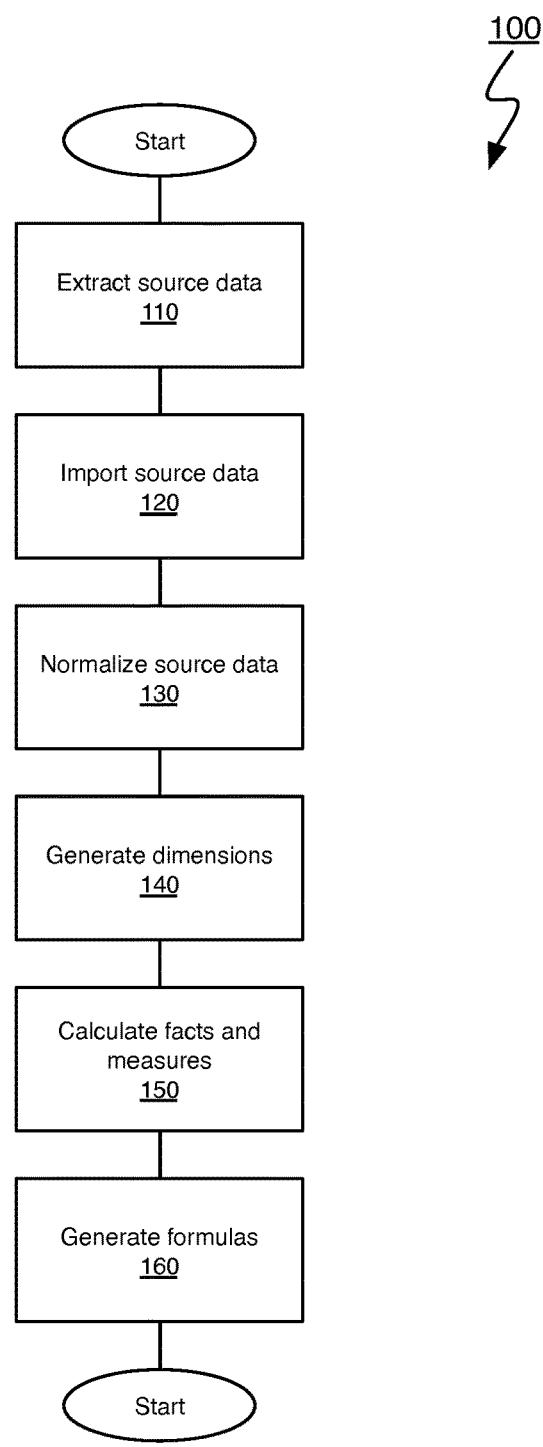
FIG. 3 is a flowchart of the general method of initializing the analytics server of FIG. 1.

FIG. 3 illustrates the general method 100 of initializing the analytics server 20. In order to reduce effort to handle queries with expanded data requirements generated after initialization, all relevant data is extracted from the source system 24 and imported into the analytics server 20. The analytics server 20 then normalizes the imported data and generates dimension and fact tables from it. Formula tables are then generated to adjust the data and to capture knowledge not necessarily present in the source data.

Figure 4:
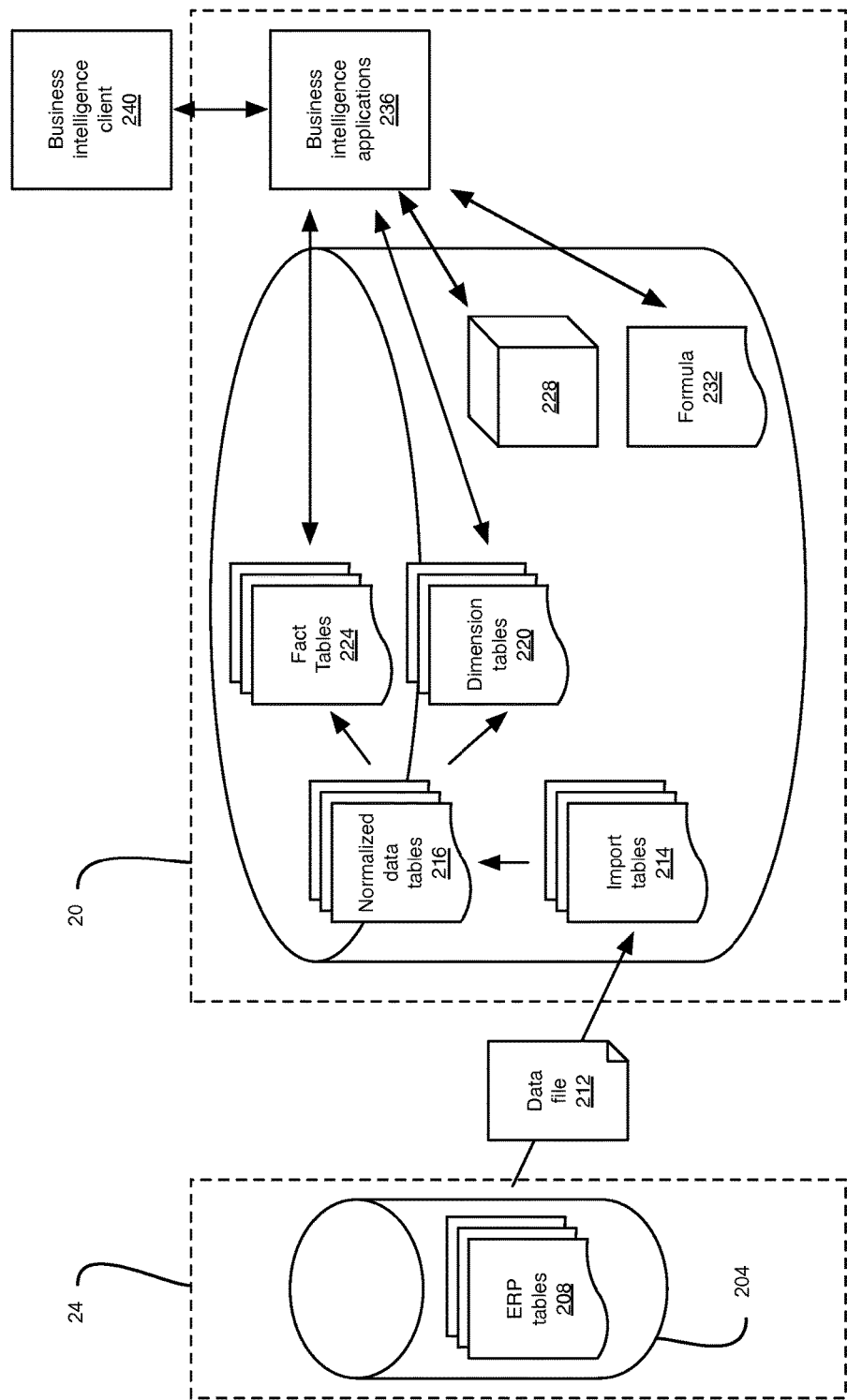
FIG. 4 shows a schematic diagram of various data sets of the analytics server and an ERP system of FIG. 1 in relation to the method of FIG. 3.

Referring now to FIGS. 3 and 4, the method 100 commences with the extraction of source data from the source system 24 (110). A series of templates for modeling the data for various industries, such as chemical and manufacturing, are made available to an administrator of the source system 24. The administrator of the source system 24 selects the most suitable template and uses it to structure data extraction procedures from the source system 24. For example, all of the relevant data is thus extracted periodically in comma-separated value ("CSV") format matching the structures set out in the selected template. As the extraction process may be time consuming, the extraction of data from the source system 20 is scheduled to be performed during off-peak hours. The extracted CSV-formatted data is stored in an intermediate data file 212. The intermediate data file 212 may be used for data correction and auditing.

Once the source data is extracted from the source system 24 at 104, the source data is imported into import tables 214 (120). The analytics server 20 parses the intermediate data file 212 and constructs the import tables 214 using the source data contained therein. The import tables 214 (whose names are prefixed with "PVI") generally match the data layout of the intermediate data file 212. These import tables 214 are stored by the analytics server 20.

Once the source data is imported into the import tables 214, it is normalized (130). The analytics engine parses the import tables 214 and identifies the organization's structure, such as its sales and plants, and the structure and recipe for its products. As the layout of the import tables 214 is defined by the established templates used to extract data from the source system 24, the data can be normalized via a set of scripts to generate normalized data tables 216. The data from the import tables 214 is reorganized to minimize redundancy. Relations with anomalies in the data are decomposed in order to produce smaller, well-structured relations. Large tables are divided into smaller (and less redundant) tables and relationships are defined between them. The normalized data tables 216 (whose names are prefixed with "PVN") are stored by the analytics server 20.

Figure 5:
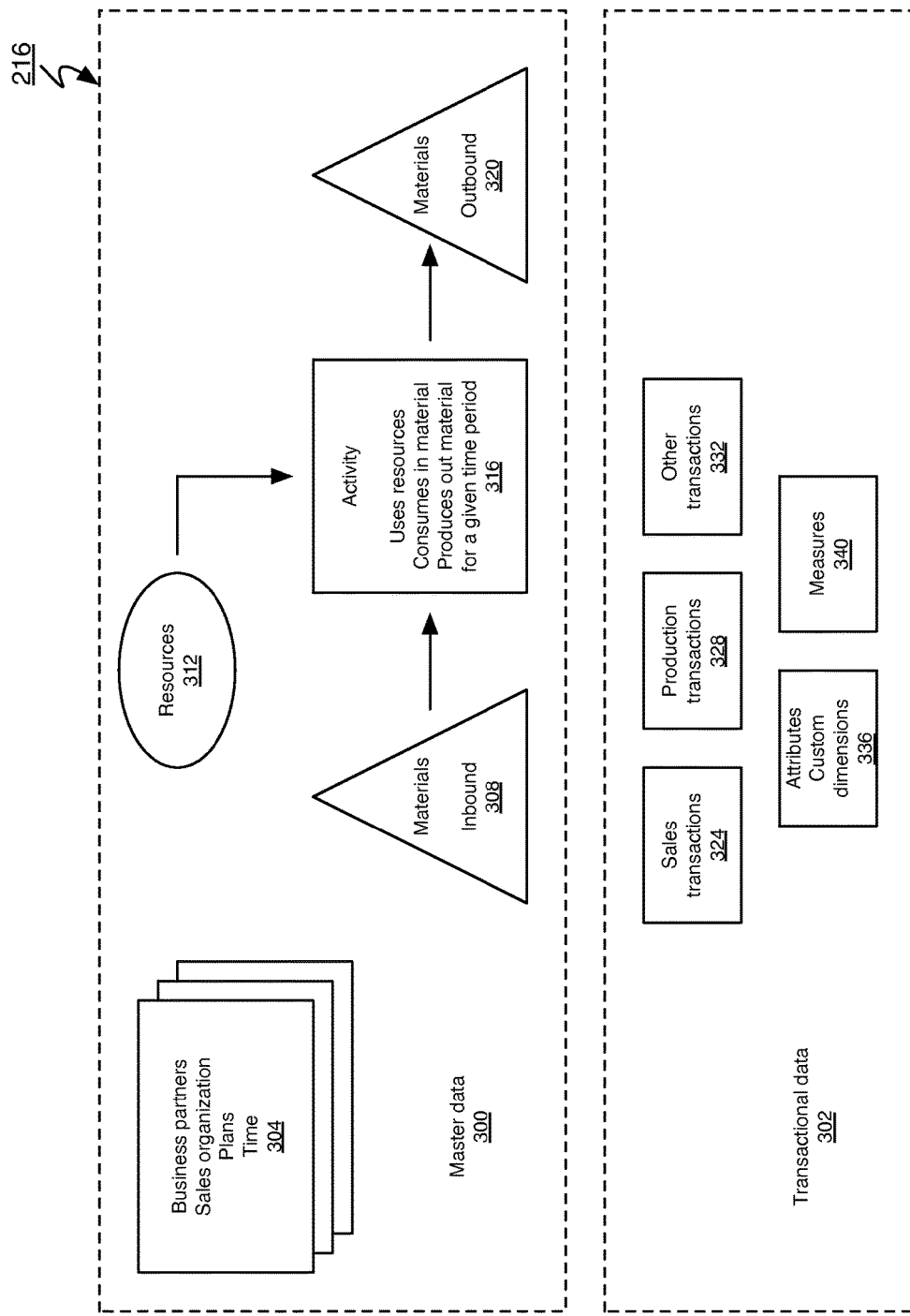
FIG. 5 shows the normalized data model into which data from the ERP system of FIG. 1 is imported.

FIG. 5 illustrates the normalized data tables 216 that the analytics engine populates with the imported source data. The imported source data relating to the organization's structure, then product structures and recipes (i.e., products) are used to populate a set of master data tables 300, and the imported source data relating to the organization's transactions (e.g., sales and production) is used to populate a set of transactional data tables 302.

The master data tables 300 store non time-phased elements. These include organizational data 304, inbound materials data 308, resource data 312, activity data 316 and outbound materials data 320. The organizational data 304 includes the following tables:

- PVN_BusinessPartner—business partners, such as customers, customer groups, market segments, suppliers, vendor groups, other third-parties, etc.
- PVN_SalesRep—sales representatives
- sales regions/divisions
- production plants
- time (e.g., where an organization's fiscal year does not coincide with the calendar year)

Figure 6A:
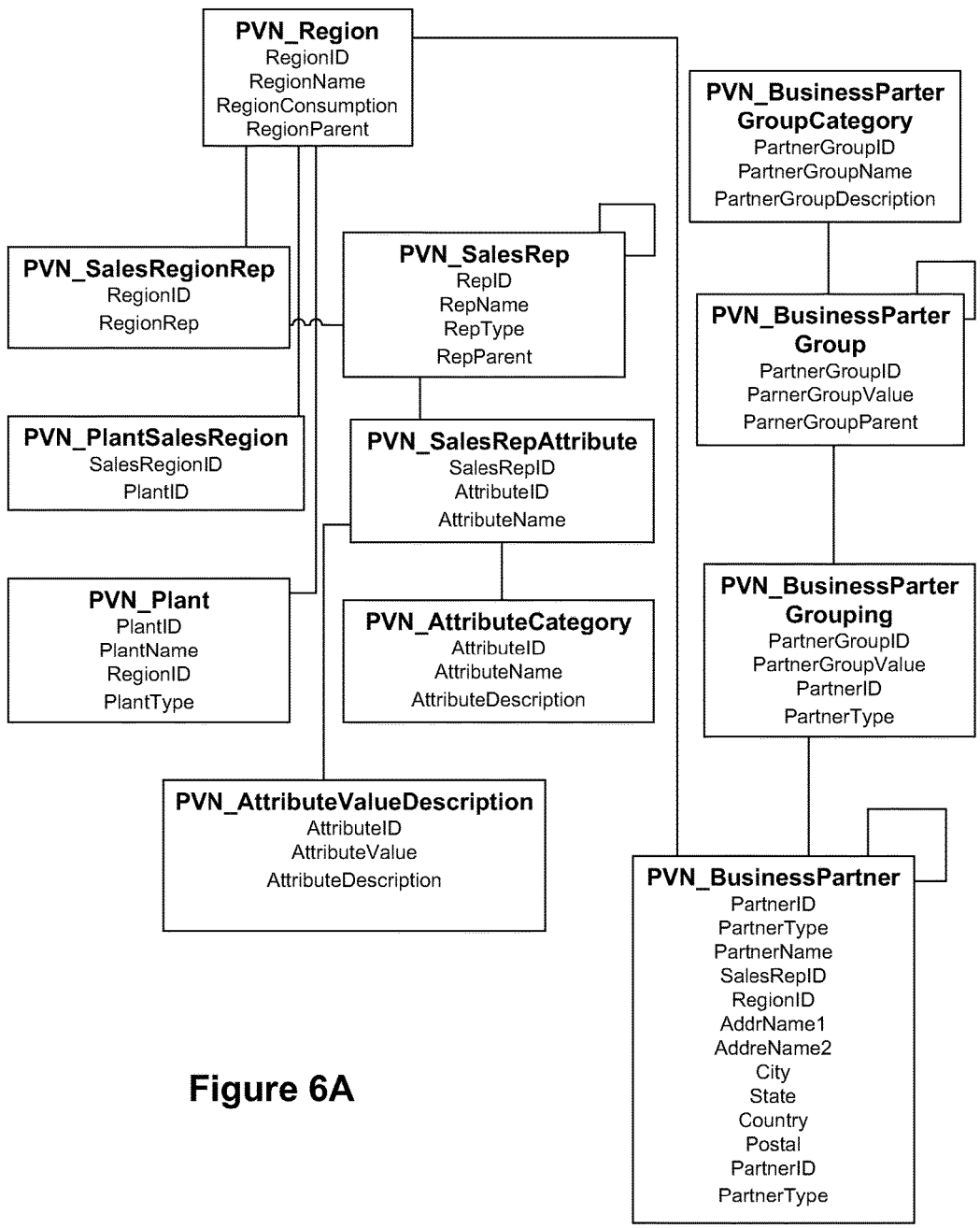
FIG. 6A shows the schema for the master data tables for sales representatives, business partners, and plants in the normalized data tables of FIG. 4.

FIG. 6A shows the schema for the master data tables for sales representatives, business partners, and plants.

Referring again to FIG. 5, the inbound materials data 308 and outbound materials data 320 are stored in a table called PVN_Material and include product groups, intermediates, raw material groups, standard costs, etc. Materials are any goods that are consumed and produced by an activity. Outbound materials can include by-products, such as scraps, that may offset the costs of the inbound materials when determining the total cost of an activity. Each material is uniquely identified.

The resource data 312 is stored in PVN_Resource and includes a list of resources. A resource is any entity that is required to perform the activity but is not materially consumed by the activity (e.g., shifts, equipment, warehouses, etc.). Resources have costs that are usually time-based.

The activity data 316 is stored in PVN_Activity and its associated tables include activity recipes, bills of materials, and routings. An activity is a required task that is needed to add economic value to the product that an organization sells (e.g., press alloy 6543 with die #1234). An activity type is a group of activities that performs similar tasks (e.g., extrusion, painting, cooking, etc.). The activities are linked together via inbound materials and outbound materials. For example, a first activity can produce a widget. A second activity for making a multi-widget may require widgets as inbound materials. As a result, the first activity is performed to produce a widget that is then an inbound material for the second activity.

Figure 6B:
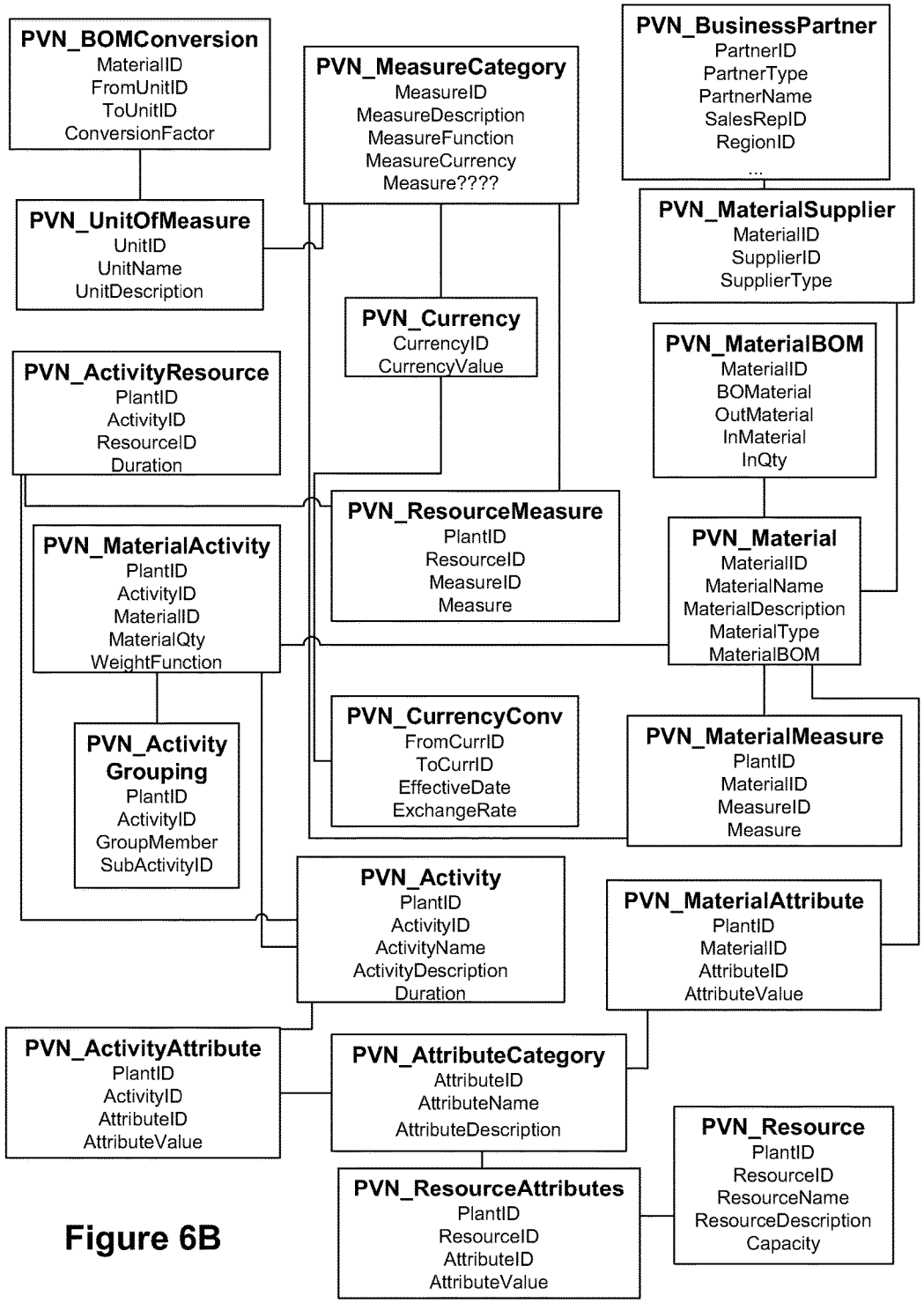
FIG. 6B shows the schema for the master data tables for materials, resources, and activities in the normalized data tables of FIG. 4.

FIG. 6B shows the schema for the master data tables for materials, resources, and activities.

Figure 6C:
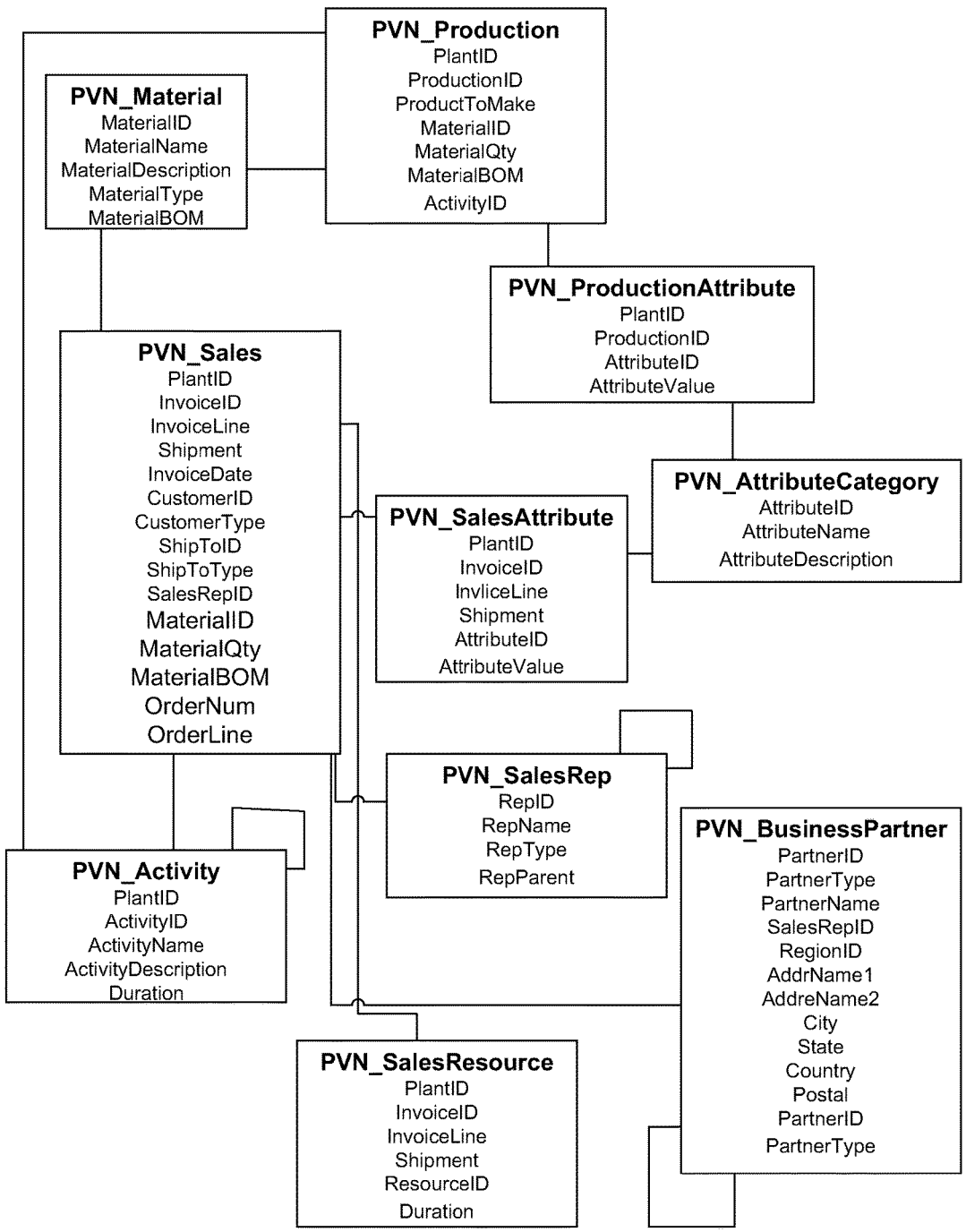
FIG. 6C shows the schema for the transaction data tables for production and sales in the normalized data tables of FIG. 4.

Returning again to FIG. 5, the transactional data 302 is data that is linked to the materials. Sale transaction data 324 relating to materials sold is stored in PVN_Sales, and includes:

- quantity and price
- customer that purchased the materials
- sales person who sold the materials
- plant that the material is being sourced from
- sales-specific charges and costs (e.g., freight)
- time of sale Production transaction data 328 relating to materials produced is stored in PVN_Production, and includes:

- materials built/processed (quantity/batch size)
- time of production
- run duration (cycle-time)
- plant FIG. 6C shows the schema for the transaction data tables for production and sales.

Referring again to FIG. 5, the other transaction data 332 is stored in PVN_Transaction, and includes data for user-defined transactions, such as quotes.

Each master and transaction table has its own associated attribute table 336. For example, PVN_Material has an associated PVN_MaterialAttribute table. These attribute tables 336 allow the analytics engine to aggregate the data in different ways. User-defined attributes can be introduced in these attribute tables 336. In this manner, the data can be aggregated in user-defined manners. The name and description of the attributes are defined in the table PVN_AttributeCategory. The maximum length of the name of an attribute is 25 characters and the maximum length of the value is 50 characters.

Each entity (activity, material, resource, sales, production) that participates in the manufacturing process has its own associated measure table 340. These measure tables 340 record the data for that entity when it takes part in the process. The name and description of the measures have to be defined in the table PVN_MeasureCategory. The maximum length of the name of a measure is 25 characters and the value is always stored as decimal (20,6).

Figure 7:
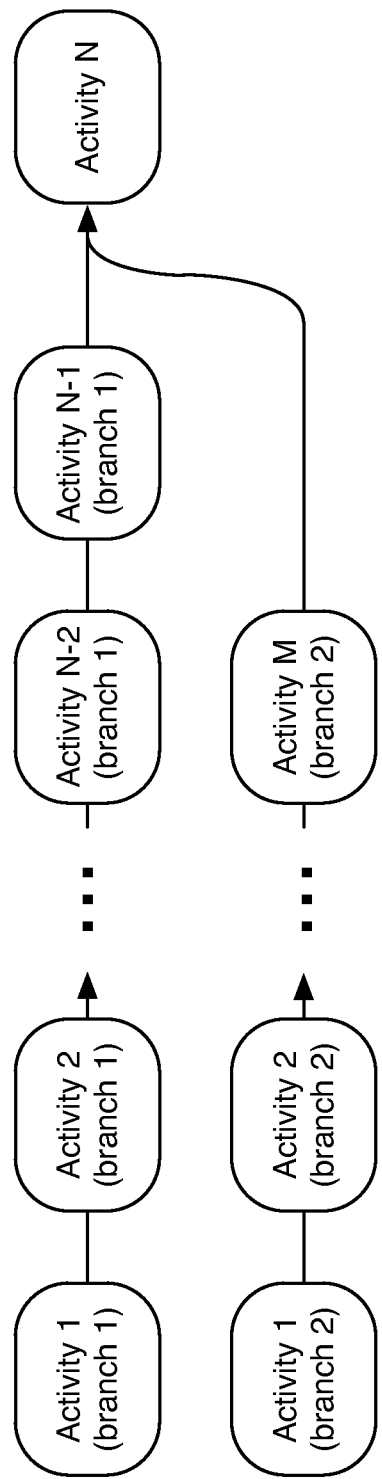
FIG. 7 illustrates a material activity tree generated by the analytics server of FIG. 1 for a product that relates the data imported from the ERP system to activities.

FIG. 7 illustrates a hierarchical structure referred to as a material activity tree that represents the production of a product, the providing of a service, etc. The material activity tree is a set of activities chained together according to dependencies. In the production of a product, the activities can include, for example, the production of subcomponents and solutions to make the subcomponents, packaging, etc. In the provision of a service, the activities can include, for example, internal tasks performed by various employees, such as the completion of documents, and external tasks, such as client meetings. The material activity tree is effectively a bill of materials. A bill of materials (sometimes "bill of material" or "BOM") is a list of the raw materials, sub-assemblies, intermediate assemblies, sub-components, components, parts and the quantities of each needed to manufacture an end product. As a result, the material activity tree is sometimes also referred to as a BOM. The same approach can be used for a bill of equipment and routings for a sequence of work centers.

As illustrated, the final activity, Activity N, has two pre-requisite activities, Activity N-1 (branch 1) and Activity M (branch 2). Each activity along the upper and lower branches of the material activity tree requires that the preceding activity along the branch be completed before it can be performed. A simplified example of such a process may be the production of a simple product, wherein the upper branch represents the assembly of the product from simple components bought from external suppliers, and the lower branch represents the production of packaging for the product. Thus, the last activity, Activity N, may be the placement of the product in the packaging.

The pseudo-code for the importation of source data from the intermediate data file 212 is shown in Appendix A.

Turning back to FIGS. 3 and 4, once the source data has been imported, dimensions are generated (140). The dimensions are stored in dimension tables 220 whose names are prefixed by the letters "PVD". Each dimension table 220 represents an axis on which data can be aggregated and grouped. In effect, each dimension table 220 is like a hierarchy. These dimensions include sales representative, plant, partner, material, resource, activity, and time. Custom attributes can be added to any of these dimensions.

The master and transaction data tables 300, 302 contain pre-defined attributes that can be used by analysis. For example, the "PartnerName" attribute of the PVN_BusinessPartner identifier for a partner allows business intelligence applications to aggregate the data according to the customer name instead of customer ID.

The following normalized data tables 216 are used to help generate the dimension and fact tables.
- PVN_AttributeCategory
- PVN_AttributeValueDescription
- PVN_Activity
- PVN_ActivityGrouping
- PVN_ActivityAttribute
- PVN_BusinessPartner
- PVN_BusinessPartnerAttribute
- PVN_Material
- PVN_MaterialBOM
- PVN_MaterialAttribute
- PVN_Production
- PVN_ProductionAttribute
- PVN_Resource
- PVN_ResourceAttribute
- PVN_Sales
- PVN_SalesAttribute
- PVN_SalesRep
- PVN_SalesRepAttribute These dimension-related tables are normalized in order to provide flexibility to add extra attributes. In order to add an extra attribute to a dimension (say PVN_Production), the attribute is first specified in the PVN_AttributeCategory. The attribute values are then added to the corresponding attribute table (i.e., PVN_ProductionAttribute).

Without further processing, the normalized data tables 216 (i.e., the master and transaction data tables named PVN_*) with their associated attribute tables form the "snowflake schema" for a basic data cube.

These dimension-related tables then are de-normalized to form a "star schema". Only one joint operation is needed to form the cube from the de-normalized dimension-related tables during runtime, increasing efficiency. Also, the attribute value can be transformed to provide more meaningful grouping. For example, a custom de-normalization process can classify the weight (an attribute) of a material to be "heavy" or "light" if the value is "<50 kg". Further, some entities like material (using PVN_MaterialBOM) and activity (using PVN_ActivityGrouping) have hierarchy support. The hierarchy is flattened during the de-normalization process.

For example, for the following material related tables, PVN_Material:

| PV_MaterialID | PlantID | MaterialID | MaterialName | Material Description | Material Type | MaterialUOM |
|---|---|---|---|---|---|---|
| M1 | P1 | M1 | M1 | Computer chair | Chair | 1 |
| M2 | P1 | M2 | M2 | Chair arm | Chair | 1 |

PVN_AttributeCategory:

| AttributeID | AttributeName | AttributeDescription |
|---|---|---|
| weight | Weight | Weight per piece |
| color | Color | Color of the base |

PVN_MaterialAttribute:

| PV_MaterialID | AttributeID | AttributeValue |
|---|---|---|
| M1 | weight | 60 |
| M1 | color | Black |

PVN_MaterialBOM:

| PV_MaterialID | BOMLevel | PV_OutMaterial | OutQty | PV_InMaterial | InQty | InUom | OutUOM |
|---|---|---|---|---|---|---|---|
| M1 | 0 | M1 | 1 | M2 | 1 | 1 | 1 | the generated material dimension table, PVD_Material, is:

| Dim ID | PV_Material ID | Plant ID | Material ID | Material Name | Material Description | Material Type | Material UOM | PV_LEVEL_0 | PV_LEVEL_1 | PV_LEVEL_LEAF | weight | color |
|---|---|---|---|---|---|---|---|---|---|---|---|---|
| 1 | M1 | P1 | M1 | M1 | Computer chair | Chair | 1 | M1 | | M1 | 60 | Black |
| 2 | M1 | P1 | M1 | M1 | Computer chair | Chair | 1 | M1 | M2 | M2 | 60 | Black |
| 3 | M2 | P1 | M2 | M2 | Chair arm | Chair | 1 | M2 | | M2 | | |

The PVD_Material (or any hierarchical) dimension table includes the attributes for the TOP (i.e., PV_MaterialID) and the LEAF (PV_LEVEL_LEAF). The attributes for the LEAF are prefixed by "PV_". For example, attribute "Description" refers to the TOP and "PV_Description" refers to the LEAF.

The following attributes that are added if the level is greater than 1.

| dimID | PV_Plant ID | PV_Material Name | PV_Material Description | PV_Material Type | PV_Material UOM | PV_weight | PV_color |
|---|---|---|---|---|---|---|---|
| 1 | P1 | M1 | Computer chair | Chair | 1 | 60 | Black |
| 2 | P1 | M1 | Computer chair | Chair | 1 | 60 | Black |
| 3 | P1 | M2 | Chair arm | Chair | 1 | | |

The pseudo-code of standard de-normalization process is included in Appendix B.

Once the dimensions are generated, measures are calculated (150). Measures include both raw and calculated values. An example of a raw value is the sale price of a material. An example of a calculated value is the cost of a piece of machinery allocated to the manufacture of the material.

Figure 8:
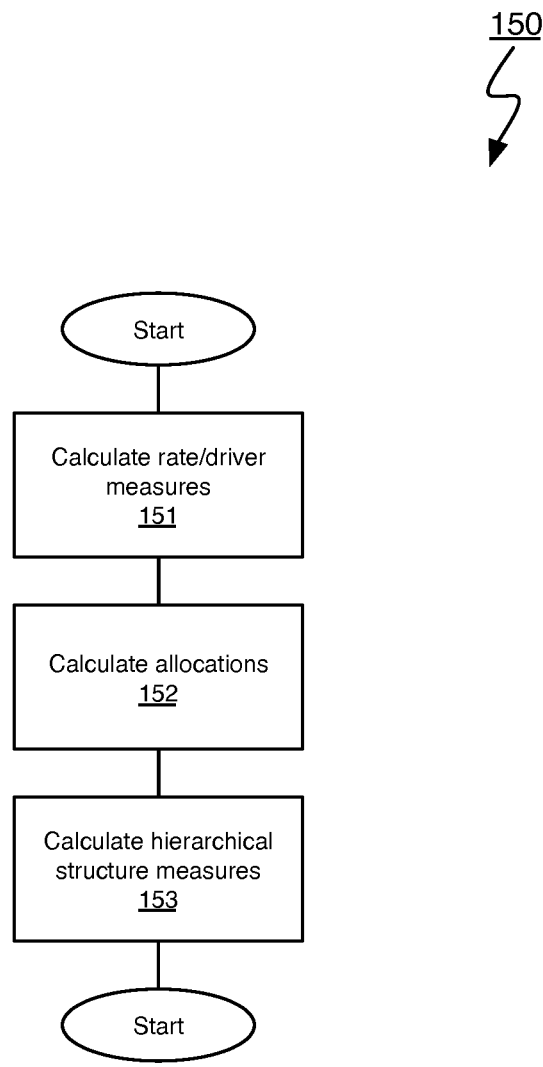
FIG. 8 is a flowchart of the calculation of measures during the method of FIG. 3.

FIG. 8 illustrates the process of calculating measures in greater detail. First, rate/driver measures are calculated (151). Rate/driver measures include costs that directly affect the production of a material. These can be time-based, volume-based, etc. For example, a rate/driver measure can be the cost of a worker that operates a piece of machinery used to manufacture a material. This measure is calculated by determining an effective hourly rate for the worker (after consideration for wages, benefits, etc.) and then multiplying that by the number of hours, or fractions thereof, of the worker's time are spent during the manufacture of a unit of the material. Another example of a rate/driver measure is the cost of a material consumed during the manufacture of the material. Dye used to color t-shirts may be purchased in gallon containers, and a fraction of that gallon may be spent manufacturing each t-shirt, leading to a cost of the dye per t-shirt. Lookups of values may be employed to generate rate/driver measures.

Next, allocation measures are calculated (152). Allocation measures include costs that indirectly affect the production of a material. For example, an allocation measure can be the portion of the cost of the construction of a plant or the company's human resources department allocated to the manufacture of the material. Like rate/driver measures, allocation measures can be time-based, volume-based, etc.

Finally, hierarchical structure measures are calculated (153). Hierarchical structure measures are composite measures corresponding to a set of related hierarchically-related objects, events, etc.

A beneficial feature of the analytics server 20 is that it can perform rapid simulation or recalculation of costs that are derived from the bill of materials of a particular product or service. For example, the analytics server 20 can quickly determine what is the updated cost for the end-material if the cost of one or more raw materials of that product is updated. The same is true for other measures associated with the BOM components, such as durations, equipment costs, customer costs, other group-by-combination costs, etc.

In order to determine a revised cost for the end-material for an updated component (material, equipment and/or resource) cost, the BOM of the end-material may be traversed with the updated component (material and equipment) costs. A traversal of the BOM means that the BOM structure is repeatedly queried every time a cost update is being performed. Since this is an often-performed use case, it can be inefficient to continue to traverse the BOM every time. This can become particularly evident when the impact of a change in a raw material is measured across the business of an entire organization.

The analytics server 20 facilitates recalculation of measures related to a BOM by determining the cost relationship between the finished product (i.e., the end-material) and its components (i.e., the raw material inputs).

The total product cost (minus the transfer fees, taxes, etc.), consists of all the material and processing costs of that product. The cost contribution of a component material or equipment can be represented by the following:

$$\text{PRODUCT\_COST}_{com} = \text{COM}_{per} \times \text{COM}_{cost}$$

$\text{PRODUCT\_COST}_{com}$ represents the cost of a single component relative to a single unit of the finished product. $\text{COM}_{per}$ represents the fraction or percentage representing the weight of the $\text{COM}_{cost}$ to $\text{PRODUCT\_COST}_{com}$. For example, if both the finished product and the component have the same unit of measure, then it would be $Q_{com}$ (quantity of the component used in the BOM to make a single unit of the finished product). $\text{COM}_{cost}$ is the per-unit cost of the component used in the BOM of the finished product. Thus, $$\text{TOTAL\_PRODUCT\_COST} = \Sigma \text{PRODUCT\_COST}_{com}$$

for all components in the BOM.

The above technique can even be more generalized. Since any group-by's consume or are related to products, the use of percentages can be applied to the group-by's themselves. For example, if it is desired to determine the raw material cost impact to a list of customers, the $\text{COM}_{per}$ can be calculated for each component and customer combination.

During the calculation phase, the engine actually calculates the following fields $\text{PV\_Finished}_{Qty}$, and $\text{PV\_Component}_{Qty}$, for every component used in all the product's BOM. The division of these two measures effectively yields the $\text{COM}_{per}$ value. These two measures are stored in the base fact table, and also exist within other derived fact tables.

A similar technique can be used for equipment or resources, but instead of using quantity, the total hours and component durations are stored.

It is during the process of updating scenario, when the value of the corresponding $\text{COM}_{per}$ is required.

This technique is more efficient, and scaleable, especially when the intermediate dimensions between the components and group-by's are significantly large. For example, consider a scenario with ten plants, where it is desired to determine the marginal impact when the cost of ten raw materials is changed. Without the above approach, all the products from the ten plants must be located, and the BOM of each product that uses the ten raw materials must be traversed to determine the impact of the cost changes. If the number of products are in the thousands, the effort required to traverse each related BOM is significant.

Figure 9:
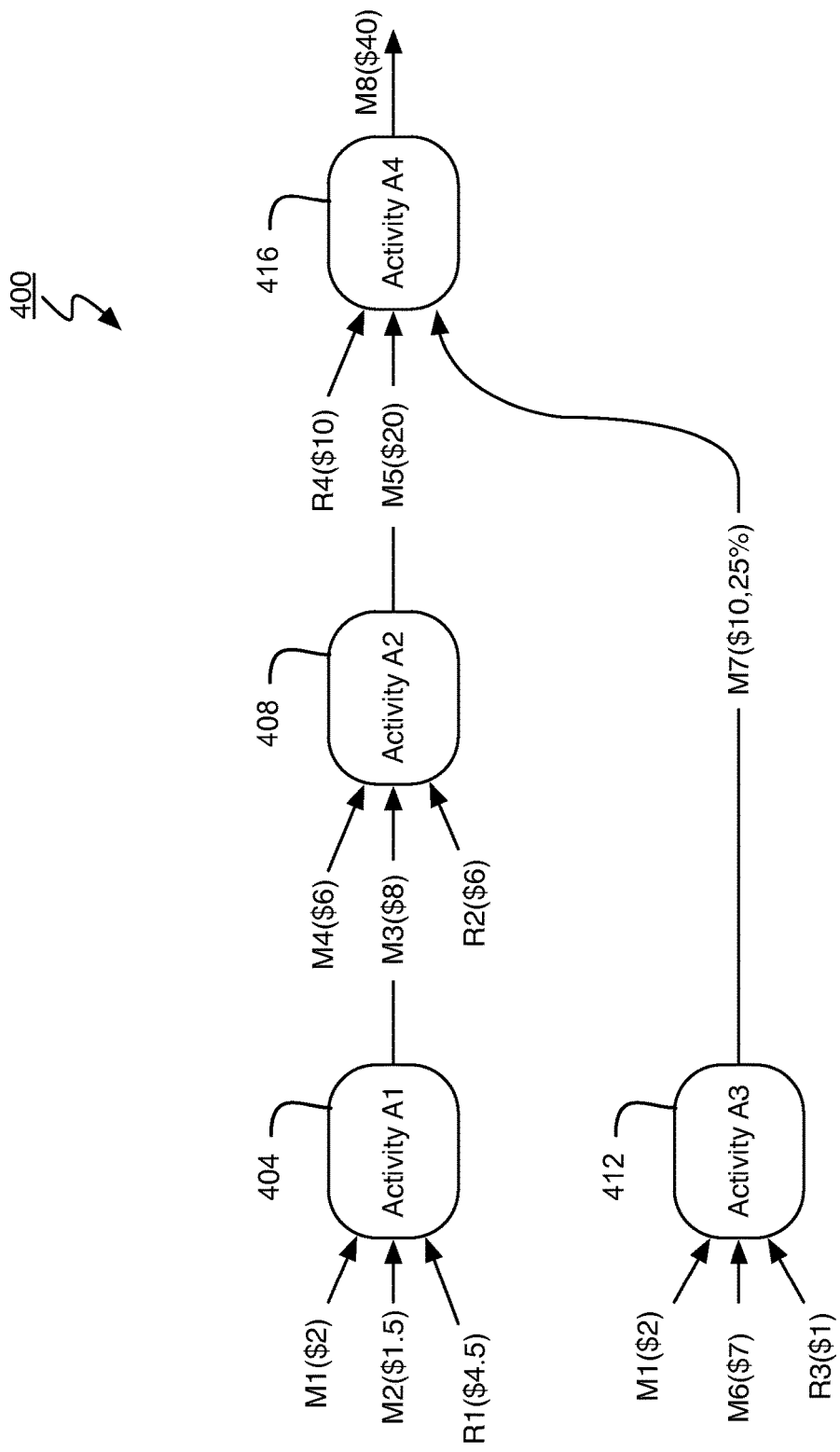
FIG. 9 illustrates an exemplary material activity tree similar to that illustrated in FIG. 7.

FIG. 9 illustrates a material activity tree 400 similar to that shown in FIG. 7. As shown, the material activity tree 400 includes four activities. A first activity 404 is shown having three inputs, material M1, material M2 and resource R1, and outputs a material M3. A second activity 408 has three inputs, material M4, material M3 from activity 404, and resource R2, and outputs a material M5. A third activity 412 has three inputs, the same material M1 that is an input for activity 404, material M6 and resource R3, and outputs a material M7. A fourth activity 416 has three inputs, resource R4, material M5 from activity 408 and material M7 from activity 412, and outputs a material M8. The cost in dollars for each material at each activity is shown.

Figure 10:
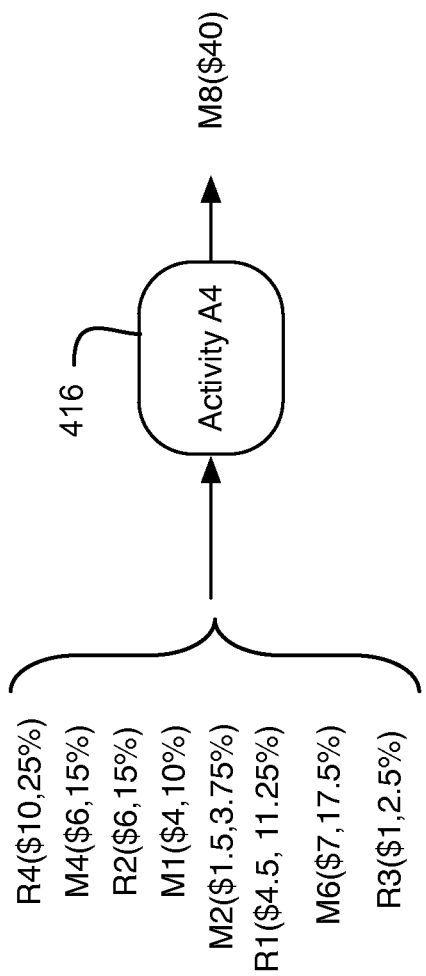
FIG. 10 shows a summary of the materials used in the material activity tree of FIG. 9.

FIG. 10 shows a summary of the materials used in the BOM of FIG. 9. The end-material, M8, is shown, as well as the total cost to produce material M8. In addition, a list of the raw materials and resources used to produce material M8 is also shown, together with the total cost of the raw material used to produce material M8. The percentage of the total cost of the material M8 has been calculated for each raw material by dividing the raw material cost for each by the total cost to produce material M8. These percentages are presented beside the total cost for each raw material.

Referring again to FIGS. 3 and 4, the measure calculation process generates fact tables 224. The fact tables 224 include PVF_Facts, which is the fact table used in the star schema.

The pseudo-code for the measure calculation process is in Appendix C.

Production and Sales Matching

In some cases, it can be desirable to more closely relate production costs for specific materials or batches of materials to specific sales. In these cases, the analytics engine attempts to match specific sales to the production of specific materials.

The common attributes that reside in both the sales documents and the production documents are product code and order number. All attributes are used first to determine the most accurate match. The attribute list is reduced with the biggest number first when a match cannot be found, yielding more general matches.

The following parameters in table PVC_FunctionParameters are used to control whether match occurs or not:

| FunctionID | ParameterName | ParameterValue |
|---|---|---|
| calc | addSalesForProduction: add the weighted average of sales measure to production record; default is "YES" | NO |
| calc | addProductionForSales: add the weighted average of production measures to sales record; default is "YES" | NO |

The following parameters in table PVC_FunctionParameters are used to control matching:

| FunctionID | ParameterName | ParameterValue |
|---|---|---|
| match | criteria.0 | OrderNum, OrderLine, PV_ActivityID |
| match | criteria.1 | *lot, PV_ActivityID |
| match | cutoff | 360 |
| match | range | 120 |
| match | production | before |
| match | sales | after |

Entries in the ParameterName field of the form criteria.0, criteria1.1, etc. specify the order of matching criteria. Each criteria consists of a list of common attributes (pre-defined or used-defined in PVN_AttributeCategory). If there are no matching transactions using criteria.n (say criteria.0), the analytics engine uses criteria.n+1 (i.e. criteria.1) to find the matching transactions. The analytics engine will stop finding until all criteria are processed. This parameter supports a special attribute "*lot". In make-to-stock situations, the set of match transactions can be obtained by comparing the "Lot" number. The table "PVS_Lot" is used to store the lot information.

| LotNumber | TransactionType: "S" for sales, "P" for production | TransactionID: SalesID if TransactionType is "S" and ProductionID if TransactionType is "P" | LotUsage: 'I' for input, 'O' for output, 'B' for both |
|---|---|---|---|

Lots are used in multiple production steps. For example,

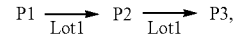

the resulting PVS_Lot table is as follows:

| LotNumber | TransactionType | TransactionID | LotUsage |
|---|---|---|---|
| Lot1 | P | P1 | O |
| Lot1 | P | P2 | B |
| Lot1 | P | P3 | I |

Cutoff refers to the time interval (in days) in which the analytics engine will try to find a match.

Range defines a time period after the first matched transaction in which other transactions occurring in the time period are included in the matched set for calculating the weighted average.

Production determines the direction of the range for matched production transactions. The values can be "before", "after" or "both". The default is "before", as production transactions usually occur before sales transactions.

Sales determines the direction of the range for matched sales transactions. The values can be "before", "after" or "both". The default is "after", as sales transactions usually occur after production transactions.

FIG. 11 shows an exemplary timeline with a production transaction, P1, for a material. A series of sales transactions, S1 to S5, falling before and after the production date are also shown. A time period (P1−cutoff, P1+cutoff) is searched by the analytics engine to locate matches. Sales transaction S2 is chosen as it is the earliest sales transaction within the cutoff period. As shown, sales transactions S2 and S3 are within the defined range and, thus, are included in the calculation of a weighted average revenue per unit.

Although sales transaction S4 lies within the cutoff interval, it is not included because it is not in the range.

Figure 12A:
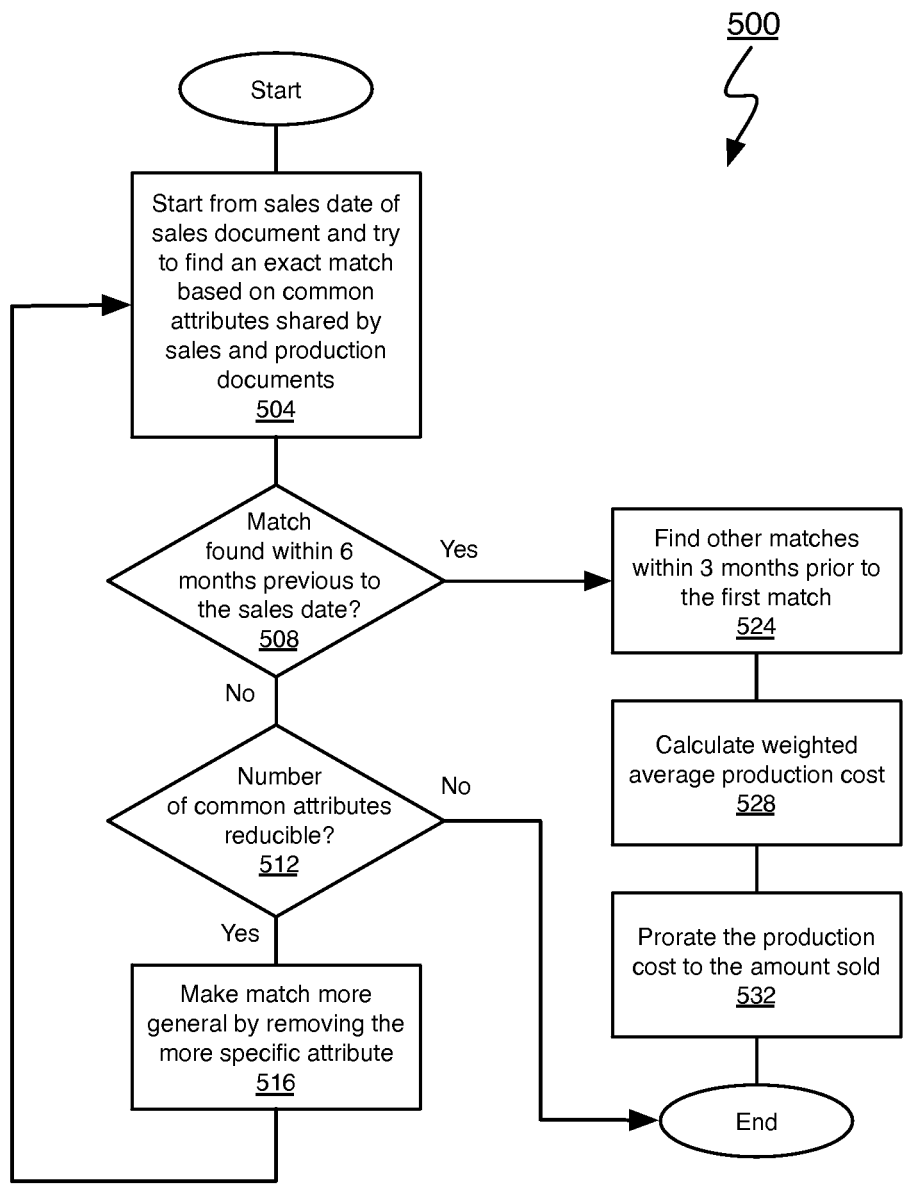
FIG. 12A shows an exemplary method of determining the production cost for a material in a sales transaction used by the analytics server of FIG. 1.

FIG. 12A shows an exemplary method 500 of determining a production cost for a material sold using the parameters for PVC_FunctionParameters shown in the table above. In particular, production transactions are assumed to occur before sales transactions. The method 500 commences by starting from the sales date of the sales document and trying to find an exact match based on common attributes shared by sales and production documents (504). It is then determined if a match is found within the six months previous to the sales date (508). If no match is found at 508, it is determined if the number of common attributes is reducible (512). If the number of common attributes cannot be reduced, no match is found and the method 500 ends. If the number of common attributes is reducible, the match is generalized by removing the most specific attribute (516). Upon reducing the number of common attributes sought, the method 400 returns to 404 to search for matches using the loosened constraints. If, instead, a match was found in the six months previous to the sales date at 508, other matches within the three months prior to the first match are looked for (524). A weighted average production cost is then calculated (528). The production cost is then pro-rated to the amount sold (532). For example, if the total production cost for the matched range is $1000 for 100 units produced, and the matched sales revenue is for 50 units, then the production costs allocated to the matched revenue will be 50/100*$1000=$500. Upon pro-rating the production cost, the method 500 ends.

Figure 12B:
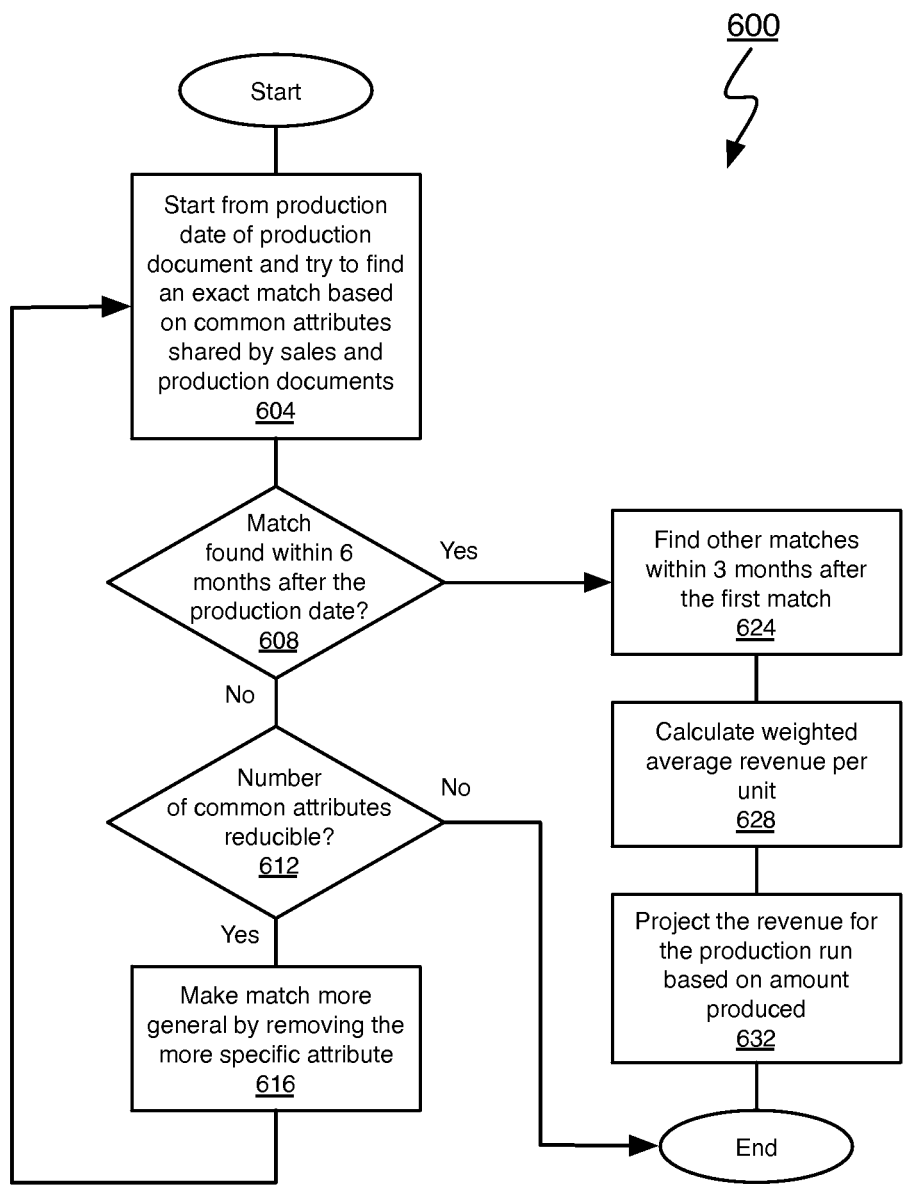
FIG. 12B shows an exemplary method of determining the revenue for a material in a production transaction used by the analytics server of FIG. 1.

FIG. 12B shows an exemplary method 600 of determining revenue for a material produced using the parameters for PVC_FunctionParameters shown in the table above. In particular, sales transactions are assumed to occur after production transactions. The method 600 is similar to the method for sales view matching illustrated in FIG. 10A, except that the searches are forward-looking, as sales are completed after production of a material. The method 600 commences by starting from the production date of the production document and trying to find an exact match based on common attributes shared by sales and production documents (604). It is then determined if a match is found within the six months after the production date (608). If no match is found at 608, it is determined if the number of common attributes is reducible (612). If the number of common attributes cannot be reduced, no match is found and the method 600 ends. If the number of common attributes is reducible, the match is generalized by removing the most specific attribute (616). Upon reducing the number of common attributes sought, the method 600 returns to 604 to search for matches using the loosened constraints. If, instead, a match was found in the six months after the production date at 608, other matches within the three months after the first match are looked for (624). A weighted average revenue per unit is then calculated (628). The revenue for the production run is then projected based on the amount produced (632). For example, if the total production cost for the matched range is $1000 for 100 units produced, and the matched sales revenue is for 50 units, then the production costs allocated to the matched revenue will be 50/100*$1000=$500. Upon pro-rating the revenue, the method 600 ends.

The fact tables 224 include PVF_Match, which stores the matching between the sales and production records.

The following optional parameters in table PVC_FunctionParameters are used to control the calculation process of the analytics engine.

| FunctionID | ParameterName | ParameterValue |
|---|---|---|
| engine | calculation: a java class that implements the interface for the calculation (com.pvelocity.rpm.calc.MeasureCalculationLiaison), allowing the user to substitute a new calculation process | com.pvelocity.rpm.calc.StandardMeasureCalculation |
| engine | matchAlgorithm: a java class that implements the interface for the matching algorithm (com.pvelocity.rpm.calc.MatchFunctionLiaison), allowing the user to implement new matching algorithm | com.pvelocity.rpm.calc.StandardMatchMachine |
| engine | matchCalculator: a java class that implements the interface for the calculating the weighted average of the matched transactions (com.pvelocity.rpm.calc.MatchCalculationLiaison), allowing the user to determine the matched transaction measures | com.pvelocity.rpm.calc.StandardMatchCalculator |
| engine | unMatchCalculator: a java class that implements the interface for calculating the measures when there are no matched transactions (com.pvelocity.rpm.calc.UnMatchCalculationLiaison), allowing the user to assign some default production/sales costs | |
| engine | sharedInstallDirectory: used if the analytics engine and the database are deployed on different servers | Microsoft Windows UNC pathname to the analytics engine installation directory, which is set up as a shared directory accessible with read permission from the database server |

The master entities (i.e. material, resource and activity) that participate in the manufacturing process have their own associated measure tables (i.e., PVN_MaterialMeasure, PVN_ResourceMeasure and PVN_ActivityMeasure). During the calculation process, these measures are calculated and added to the transactions.

For example, the following fields are used in the PVN_ActivityMeasure tables:
PV_ActivityID—the activity
MeasureID—the name of the measure, which is defined in PVN_MeasureCategory
MeasureFunction—the index of the function that is used to calculate the amount of the measure; the Java function is defined in the table PVN_MeasureFunction
Measure—the argument that is passed to the MeasureFunction The measures for transaction entities are applied directly to the transactions using PVN_ProductionMeasure and PVN_SalesMeasure. If there are some measures that apply to all transactions, these measures are specified in the PVN_GlobalTransactionMeasure. The following fields are used in these tables:
MeasureID—the name of the measure; defined in PVN_MeasureCategory
MeasureFunction—the index of the function that is used to calculate the amount of the measure; the Java function is defined in the table PVN_MeasureFunction
Measure—the argument that is passed to the MeasureFunction EntityType—stores the origin of the measure; e.g.,
1—material cost
2—resource cost
3—activity cost
EntityID—stores the key of the origin of the measure; e.g.,
MaterialID if EntityType=1
ResourceID if EntityType=2
ActivityID if EntityType=3
MeasureUOM—stores the unit of measure for the measure Using EntityType and EntityID, the analytics engine attributes the measure to a specific material, activity or resource. However, if a measure is associated with two or more entities (like activity and resource) at the same time, the following fields can be used instead of EntityType and EntityID:
PVM_Activity—the activity
PVM_Resource—the resource
PVM_Material—the material
These fields can be specified at the same time.

All the functions that are used to compute the measures are defined in PVN_MeasureFunction. Some of these functions are pre-defined by the analytics engine, namely com.pvelocity.rpm.calc.ConstantMeasure and com.pvelocity.rpm.calc.TableLookupMeasure.

When ConstantMeasure function is specified, the "Measure" column represents the final value of the measure. For the following record in PVN_ProductionMeasure:

| ProductionID | MeasureID | MeasureFunction | Measure | EntityType | EntityID | MeasureUOM |
|---|---|---|---|---|---|---|
| P-1 | ProducedWeight | 1 | 7.2 | 3 | Ext | Lbs |

Thus, the "ProducedWeight" for the production "P-1" is 7.2.

Figure 13:
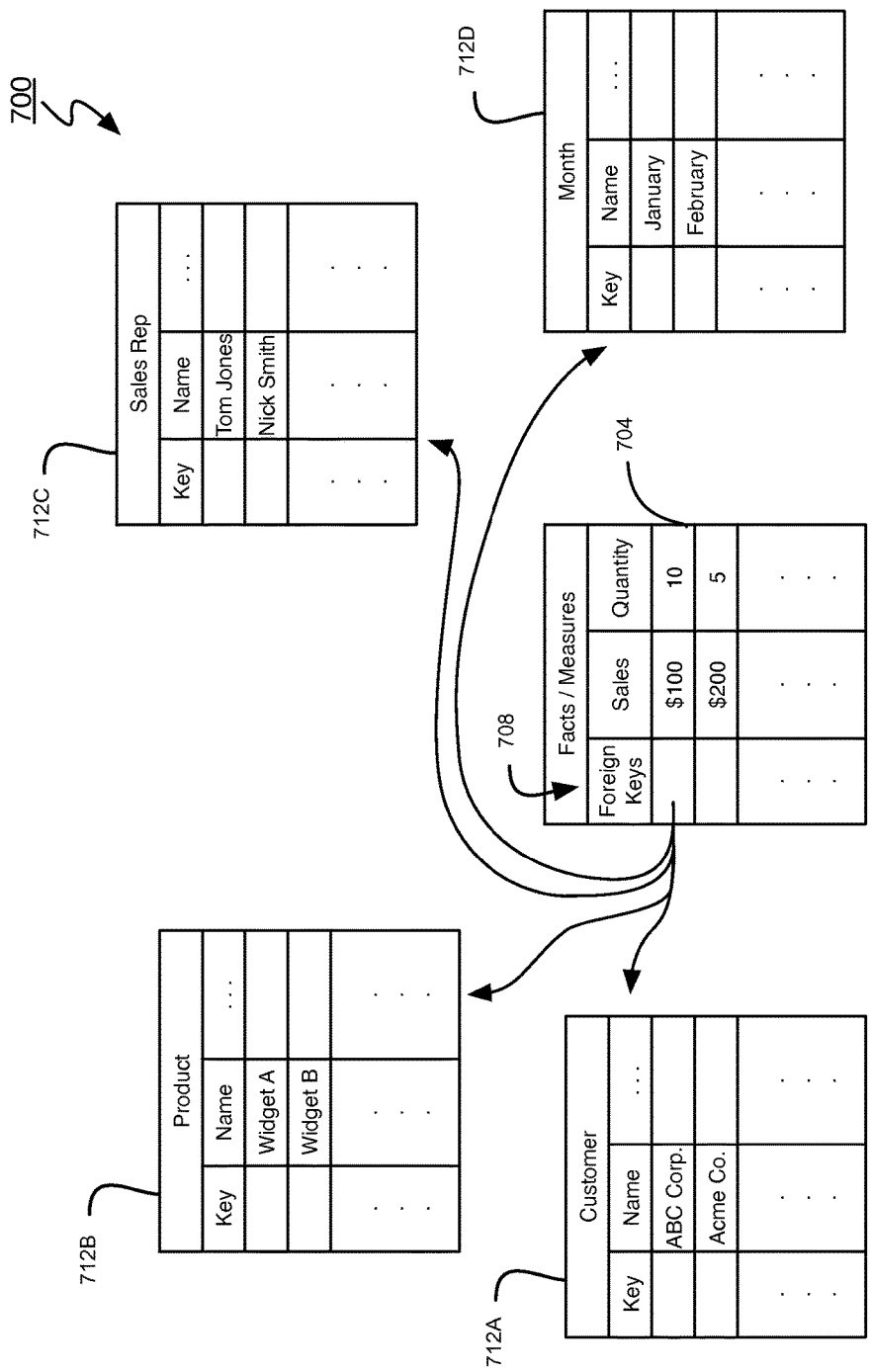
FIG. 13 represents an exemplary, simplified star schema generated by the analytics server of FIG. 1.

Sometimes, the values of the measure are collected periodically. For example, the total freight cost in a month. In this case, the cost (or measure) is distributed among the transactions according to other measures. Table PVN_PeriodLookup and the TableLookupMeasure function are used to provide this capability. For example, PVN_GlobalTransactionMeasure:

| TransactionType | MeasureID | MeasureFunction | Measure | EntityType | EntityID |
|---|---|---|---|---|---|
| 4 | PlantSupplies | 2 | 0.0 | 3 | Ext | and PVN_PeriodLookup:

| PlantID | TotalBy EntityType | TotalEntityID | TargetMeasureID | StartDate | Amount | Currency | UnitOf Measure | SplitBy EntityType | SplitBy EntityID | SplitBy Measure ID |
|---|---|---|---|---|---|---|---|---|---|---|
| P1 | 3 | Ext | PlantSupplies | Jan. 1, 2006 | 50000 | US | Lbs | 3 | Ext | Material Qty | where:
PlantID—the plantID
TotalByEntityType—the entity type associated with the measure
TotalByEntityID—the entity ID of the measure
TargetMeasureID—the name of the measure
StartDate—the start date of the monthly data
Amount—the total amount for the month
Currency—the currency of the monthly total
UnitOfMeasure—the unit of measure
SplitByEntityType—the entity type of the other measure that determines the distribution; e.g., the MaterialQty (SplitByMeasureID) of the Extrusion "Ext" (SplitByEntityID) activity (SplitByEntityType)
SplitByEntityID—the entity ID of the other measure that determines the distribution
SplitByMeasureID—the measure that determines the distribution FIG. 13 illustrates an exemplary, simplified star schema 700. At the center of the star schema is a fact table 704 that contains all the measures for the imported data. Each record in the fact table 704 includes a series of foreign keys 708 referencing a set of dimension tables 712A to 712D.

Returning again to FIGS. 3 and 4, once the measures have been calculated, a formula table 232 is generated (160). The formula table includes formulas such as for calculating commission rates, discount rates, freight costs, etc.

Updating of Transaction Data

The analytical information that is used by the analytics engine is updated periodically in order to include the newly generated transaction data. Since the calculation is time-consuming, the analytics engine provides a way to generate the new analytical information incrementally. When new transaction (i.e. sales and production) records are generated, a new database (e.g., PVRPM_Inc) is created to store the new data. It merges the original analytical information stored in another database (e.g., PVPRM_Base). It may also point to a separate user database (e.g., PVRPM_User) that stores the user preferences. The following parameters in table PVF_FunctionParameters are used by incremental measure calculation:

| FunctionID | ParameterName | ParameterValue |
| --- | --- | --- |
| engine | userdb: database that stores user configuration information; e.g. PVC_DerivedMeasure, App_*, etc. | jdbc: sqlserver://localhost:1433; DatabaseName=PVRPM_User; user=sa;password=sa |
| engine | basedb: database that stores the original analytical information | jdbc:sqlserver://localhost:1433; DatabaseName=PVRPM_Base; user=sa;password=sa |
| engine | incrementalPreprocessor: a java class that implements the interface for the incremental preprocessor, com.pvelocity.rpm.calc.IncrementalPreprocessorLiaison; allows the user to remove the obsolete data in the original analytical database | com.pvelocity.rpm.calc.IncrementalUpdateByDateRange |
| engine | remove.Sales.0: the parameters that are processed by the incrementalPreprocessor; specifies the plant and the date range of the obsolete data in the original analytical database | 1,2004/03/01,2004/03/14 |
| engine | remove.Production.0: the parameters that are processed by the incrementalPreprocessor; specifies the plant and the date range of the obsolete data in the original analytical database | 1,2004/03/01,2004/05/01 |
| engine | lockCondition: data that satisfy the lockPeriod and lockCondition in the orginal analytical database will be moved to the new database without changing | |
| engine | lockPeriod: see comments on lockCondition | |

Cube Generation

Using the dimension tables 220 and the fact tables 224, the analytics engine generates one or more cubes 228 that represent aggregated data used in the analysis. The cubes are defined using SQL tables and are named with the prefix PV3_*. These cubes are cached to improve performance. The table PVF_CachedCubes is used to implement the cache.

| CubeSignature | CubeTableName | CubeCreator | Hits | LastUsedTime |
| --- | --- | --- | --- | --- |
| 1027105\|1027263\|1\|PVD_Material\|D31\| MATERIAL\|MATERIAL\|MATERIALID\| MaterialID varchar(25)\|Q\|null | PV3_1149100238625_15606014 | Admin | 1 | May 31, 2006 2:30:43 PM |

The following parameters in PVF_FunctionParameters are used to control the cache:

| FunctionID | ParameterName | ParameterValue |
| --- | --- | --- |
| cache | cacheSize: the maximum cache size, with a value of "0" indicating an unlimited cache size | 0 |
| cache | cacheTableName: the cache table name, by default "PVF_CachedCubes" | PVF_CachedCubes |
| cache | disable: used to turn off caching | false |
| cache | expiredCheckPeriod: interval (in day) to check expired cached; default value is 2 | 0 |
| cache | expiredDays: number of days of no use after which a cube; default is 10 | 0 |

| FunctionID | ParameterName | ParameterValue |
|---|---|---|
| cache | initialCacheSize: initial cache size when the engine starts up; if the existing cache size is more than the "initialCacheSize" when the engine starts up, the least recently used or least frequently used cubes are removed; default is 100 | 100 |
| cache | initialExpiredDays: specifies the expired day when the engine starts up; default is 10 | 10 |
| cache | replacementPolicy: LRU (Least Recently Used) or LFU (Least Frequently Used) policy can be implemented when cacheSize is reached | LRU |

Cubes 228 aggregate the data in the dimension tables 220 and fact tables 224.

Once the cubes 228 and the formula table 232 have been generated, business intelligence applications 236 enable users to query, manipulate and view the data therein.

Baby Fact Tables

The master facts table PVF_Facts contains data for both sales and production categories. As the master facts table can be very large in many cases, all cube formations (except drill-down and summary cube formations) accessing this master facts table can lead to very slow cubing performance. In order to accelerate the generation of cubes, the analytics engine generates subsets of the fact tables for handling specific queries. These smaller fact tables are referred to as baby fact tables.

Baby fact tables are generally much smaller than the master fact table, thus greatly accelerating access to it. In addition, its clustered index is smaller and is more prone to be cached in memory. Moreover, there is no need to include the category column, a low-selectivity column with only values 'S' and 'P', as part of the index. Often many measures only apply to one category (e.g. freight cost only meaningful in Sales queries), so a baby fact table can forgo the irrelevant measures, and no time is wasted in aggregating these measures. Often some dimensions only apply to one category (e.g. SalesRep dimension is often not populated in production records). Therefore, the clustered index can forgo irrelevant dimensions, resulting in a narrower index. Additional non-clustered indexes can be applied on each baby fact table according to runtime query patterns. In multi-user environment, I/O convention is reduced since we have two separate, independent fact tables.

Figure 15:
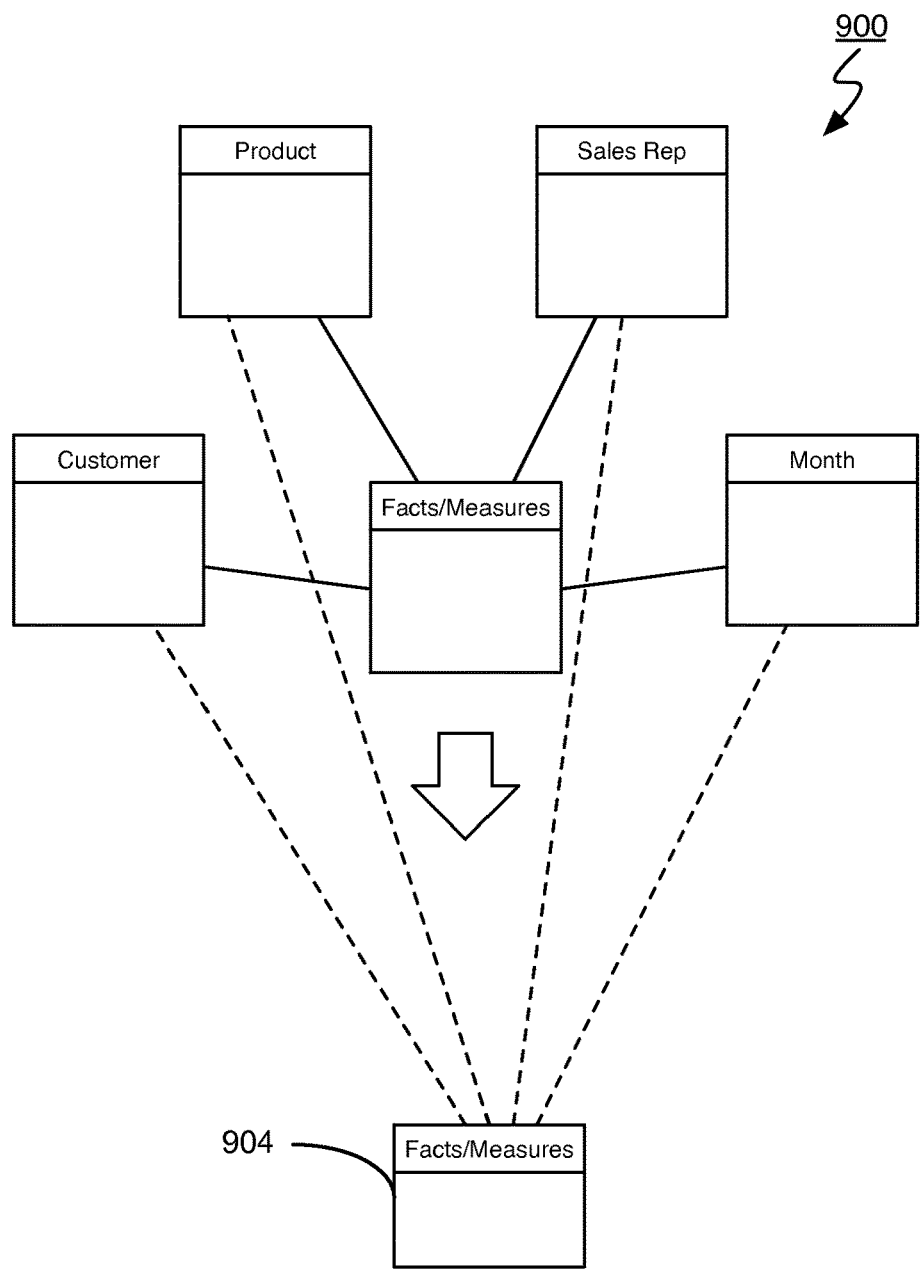
FIG. 15 illustrates the generation of a baby fact table by the analytics server of FIG. 1.

FIG. 15 shows the generation of a baby fact table. The fact tables and dimension tables that define the star schema of FIG. 13 are shown at 900. The records of the main facts table are filtered to distill a baby fact table 904.

The fact tables for some implementations continue can grow very large, as they put in data for greater time span, or because the nature of an organization's business and intended usage tend to result in large fact tables (e.g., the organization has lots of BOM and they need to see material linkages). The more specific the baby fact table, the better the performance. In order to make a baby fact table very specific, it should contain only the set of dimension(s) that encompass all the query group(s), plus the plan and time dimensions if not already in the set. Also, the formal semantic for a set applies here, in that the order of dimensions is insignificant. With that in mind, the basis for creating baby fact tables should not just be the category, but be generalized to include a dimension set. The following passages outline an optimization scheme based on this idea.

Similar to the way the analytics engine keeps a cache of generated cubes, the analytics engine has a fact table pool. For each query, based on its category and referenced dimension set, the analytics engine tries to find the most specific baby fact table available in the pool that can satisfy the query. Note if such a pooled table exists, it may not be the optimal one for that query, because the pooled table may still contain more dimensions than is minimally needed by the query. The analytics engine may fall back to use the category baby fact table (i.e. the one with all dimensions), if no pooled table can satisfy the request. However, the engine keeps track of the number of such fact table pool misses, and the resultant cube creation time. This information is useful to determine whether it is worthwhile to pre-generate the missing baby fact table. Also, the analytics engine maintains statistics on pool hits as well, so that it can further optimize the most-used baby fact tables (e.g. by creating more indexes or subdivide them further).

There are two ways the analytics engine populates the fact table pool. First, parameters in the PVC_RuntimeParameter table specify what baby fact tables are to be pre-generated. The category baby fact tables are automatically created at the end of the generation of measures by the analytics engine. Pool population code is also stored by the analytics server. The pool population code creates all baby fact tables explicitly specified in the PVC_RuntimeParameter table. In addition, the pool population code looks at the fact table pool misses information and creates any baby fact tables deemed worthwhile to pre-generate.

In addition, the analytics engine analyzes the statistics for the most-used baby fact tables to see if it is possible and worthwhile to create more specific baby fact tables from them.

There are 3 levels of Baby Facts Tables for improving performance:

Category Baby Facts Tables: The master facts table is divided based on category, namely, there is one baby fact table for category Sales (PVF_Sales_Facts), and one for category Production (PVF_Production_Facts). The engine can use either baby table based on the category of the current query.

Time Aggregated Baby Facts Tables: Since the master and category fact tables contain facts at the day level, but queries are mostly by month or week, generating baby fact tables based on category baby facts tables that are aggregated by month or by week will result in baby facts tables with fewer rows, thus improving cubing performance.

Generalized Baby Facts Tables: To further reduce the required number of aggregations, the basis for creating baby fact tables can be further generalized to include only the set of dimensions that encompass all the query groups for a query.

The following time dimensions are used to support monthly and weekly aggregated facts tables:
  TimeMth—time month dimension, table PVD_TimeMth
  TimeWk—time week dimension, table PVD_TimeWk
These additional time dimension tables are automatically created/populated following generation of the time dimension (PVD_Time) during dimension generation and incremental dimension generation.

The following PVC_FunctionParameters table enables specification of whether baby fact tables are generated and used at runtime:

| FunctionID | ParameterName | ParameterValue | Default if not defined |
| --- | --- | --- | --- |
| calc | aggregateMonthlyFacts - control whether the monthly baby facts tables should be generated and used at runtime | YES or NO | NO |
| calc | aggregateWeeklyFacts - control whether the weekly baby facts tables should be generated and used at runtime | YES or NO | NO |
| calc | generateBabyFactsTables - control whether category, time aggregated and generalized baby facts tables should be generated during calculation and incremental calculation | YES or NO | YES |

Time aggregated category facts tables are created for the sales and production categories only, and is not applicable for user-defined categories. After the category baby fact tables (PVF_Sales_Facts, PVF_Production_Facts) are updated, the monthly and weekly aggregated category baby fact tables are generated if the corresponding function parameter described above is set to YES. These table names have the following format:

| Table Name Format | Used For | Example |
| --- | --- | --- |
| PVF_category_Facts_Month | corporate currency monthly aggregated facts | PVF_Sales_Facts_Month |
| PVF_category_Facts_Month_currency | other display currency monthly aggregated facts | PVF_Sales_Facts_Month_EUR |
| PVF_category_Facts_Week | corporate currency weekly aggregated facts | PVF_Production_Facts_Week |
| PVF_category_Facts_Week_currency | other display currency weekly aggregated facts | PVF_Production_Facts_Week_EUR |

The time aggregated category baby fact tables have the same set of dimensions as the base category baby fact table (e.g. PVF_Sales_Facts) except for the time dimension. The monthly aggregated baby fact tables reference the TimeMth dimension (column name TimeMthDim) instead of the time dimension. The weekly aggregated baby fact tables reference the TimeWk dimension (column name TimeWkDim) instead of the time dimension. The clustered index created for these time aggregated category baby fact tables is the set of active dimension columns in descending order of the corresponding PVD table row count. That is, the first column in the clustered index is the dimension column of the dimension with the most entries in its dimension table. No non-clustered index is created.

Creation of generalized baby fact tables is invoked after generating time aggregated category baby facts tables. This is driven by the content of the new facts table pool table PVF_FactsTablePool. The generalized baby fact tables may be aggregated by month or week if the corresponding function parameter is set to YES. The fact table pool entries in PVF_FactsTablePool table are manually defined by the implementer of the application. If the PVF_FactsTablePool table does not exist in the database, it will be created automatically upon first use. This table consists of two columns:

| Column Name | Comment |
| --- | --- |
| FactsTableName | There is no required format for the table name. The table is dropped and re-created during calculation. |
| FactsSignature | Must be specified in the format described below. |

The format for the fact table signature specified in column PVF_FactsTablePool.FactsSignature is:
  category|currency|Comma separated dimension names
  The signature entry is not case-sensitive.
  The dimension names must be these values defined in the dimension class: Activity, BusinessPartner, Material, Plant, Production, Resource, Sales, SalesRep, Time, TimeMth, TimeWk
  The signature must include one of the three time dimensions Time, TimeMth, or TimeWk. The implementer ensures ensure that the aggregateMonthlyFacts or aggregateWeeklyFacts Function Parameter is set if the TimeMth or TimeWk is referenced in the signature respectively.
  The signature must include the Plant dimension.
  A non-clustered index will be created on the baby fact table based on the order of the dimension names in the signature. Examples of fact table signatures:
    Sales|USD|Material, Plant, TimeMth
    SALES|EUR|SALES, SALESREP, TIME, PLANT
    Production|GBP|Plant, TimeWk, Material, Activity
  The clustered index created on generalized baby fact tables is the set of active dimension columns in descending order of the corresponding PVD table row count. That is, the first column in the clustered index is the dimension column of the dimension with the most entries in its dimension table. One non-clustered index is created based on the order of dimension names in the fact table signature.

The generalized baby fact tables specified in the PVF_FactsTablePool table are loaded into memory at startup of the analytics engine. When a query requires a new cube to be created, the engine will try to find a baby fact table in the pool that will satisfy the query and give the best cube population performance. The choice of baby fact table is based on the following factors:
  The baby fact table row count. Tables with fewer rows are considered first.
  The baby fact table must include all the dimensions required by the query. If two baby fact tables have the same row count and both include all the required dimensions, the baby fact table with the fewer dimensions will be selected.

If no suitable generalized baby fact table is found, cube population will try to use a time aggregated category fact table if the time dimension requirement matches, and the corresponding PVC_FunctionParameters is set. If still not suitable, the base category fact table will be used.

The factors that determine the time dimension required for the query are:

Date range by month, week or YTD:
  If query is by month, TimeMth and Time dimension baby fact tables can be considered.
  If query is by week, TimeWk and Time dimension baby fact tables can be considered.
  YTD date range is considered as by month.
Time dimension attribute in group by:
  If attribute is Year or Month, TimeMth and Time dimension baby fact tables can be considered.
  If attribute is Year or Week, TimeWk and Time dimension baby fact tables can be considered.
Query filters:
  If a role-based query filter or a global query filter contains a PV_DATE variable, only the Time dimension baby fact tables will be considered.
Plant released time restricted query condition
  Plant released time is defined by month. If query is by week, both TimeMth and TimeWk dimension baby fact tables cannot be used. In this case, can only consider the Time dimension baby fact tables.

Figure 16:
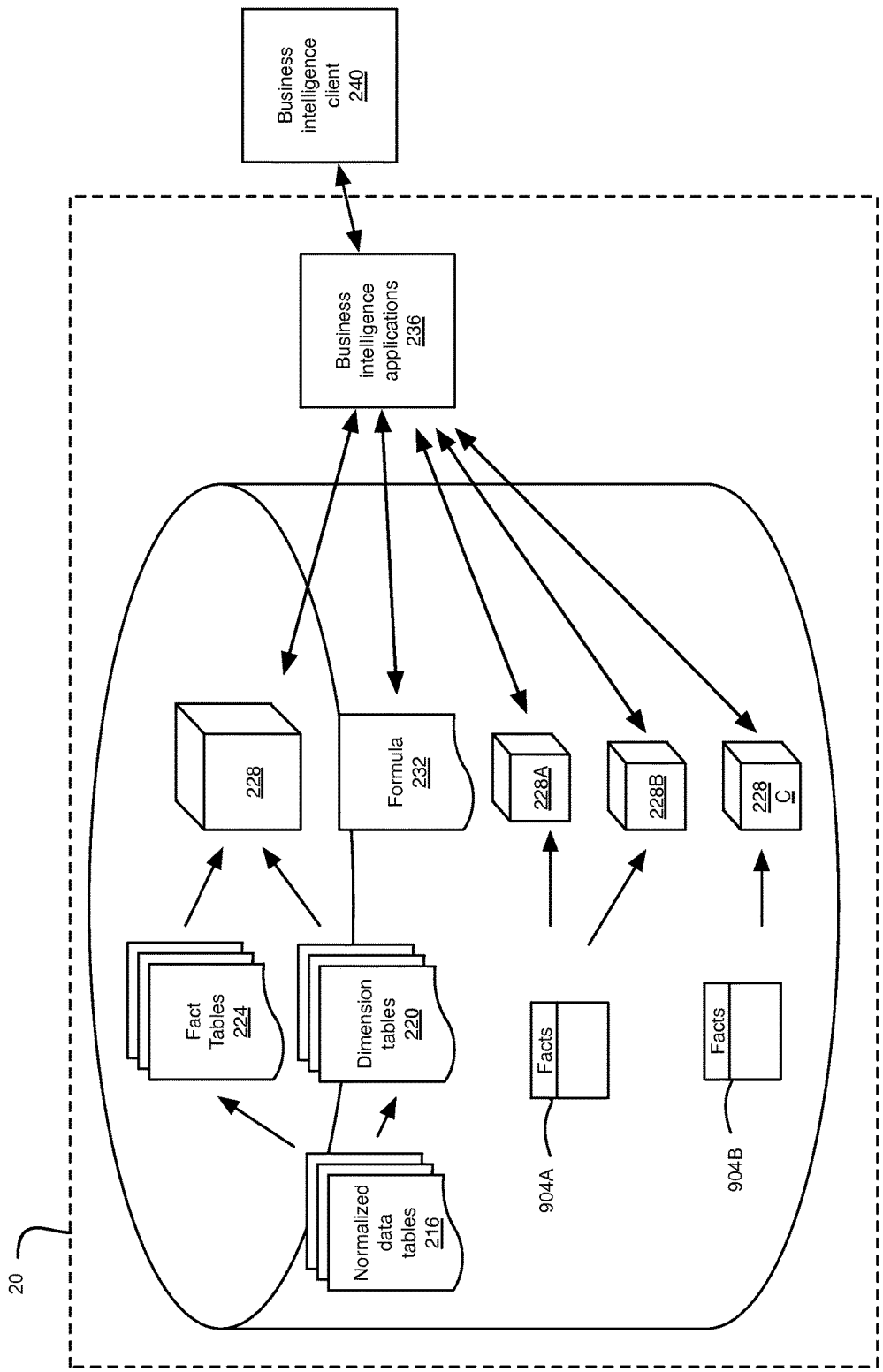
FIG. 16 illustrates the use of baby fact tables to generate cubes by the analytics server of FIG. 1.

FIG. 16 shows two baby fact tables 904A, 904B that were generated by the analytics engine. The first baby fact table 904A is used to generate two cubes 228A and 228B. The second baby fact table 904B is used to generate cube 228C.

Measure Derivation

An enterprise business intelligence application 236 allows the user using the business intelligence client 240 to pick a cube 228 for profit analysis by choosing different measures using the values in PVN_MeasureCategory, and different grouping using the values in PVN_AttributeCategory. It also allows the user to add extra measures that are derived from the existing data to the selected cube 228 by using the formula table 232 for profit analysis.

After the PV_Measures Tables are de-normalized, each "MeasureID" in the table "PVN_MeasureCategory" is represented by a column (or measure) in the final measure table. If the "MeasureID" is related to a resource, the "Duration" associated with the resource is also represented too. A user can add a derived measure by using the existing measures. For example, "paintLabor" and "drillLabor" may be two existing measures. A user can add a derived measure called "totalLabor" by adding "paintLabor" and "drillLabor". A PVC_DerivedMeasure table is used to store the formula of the derived measures. There are two columns in the table:

DerivedMeasureID—the name of derived measure; e.g., totalLabor
DerivedMeausreExpr—the expression of derived measure; e.g., "paintLabor+drillLabor"

Figure 14:
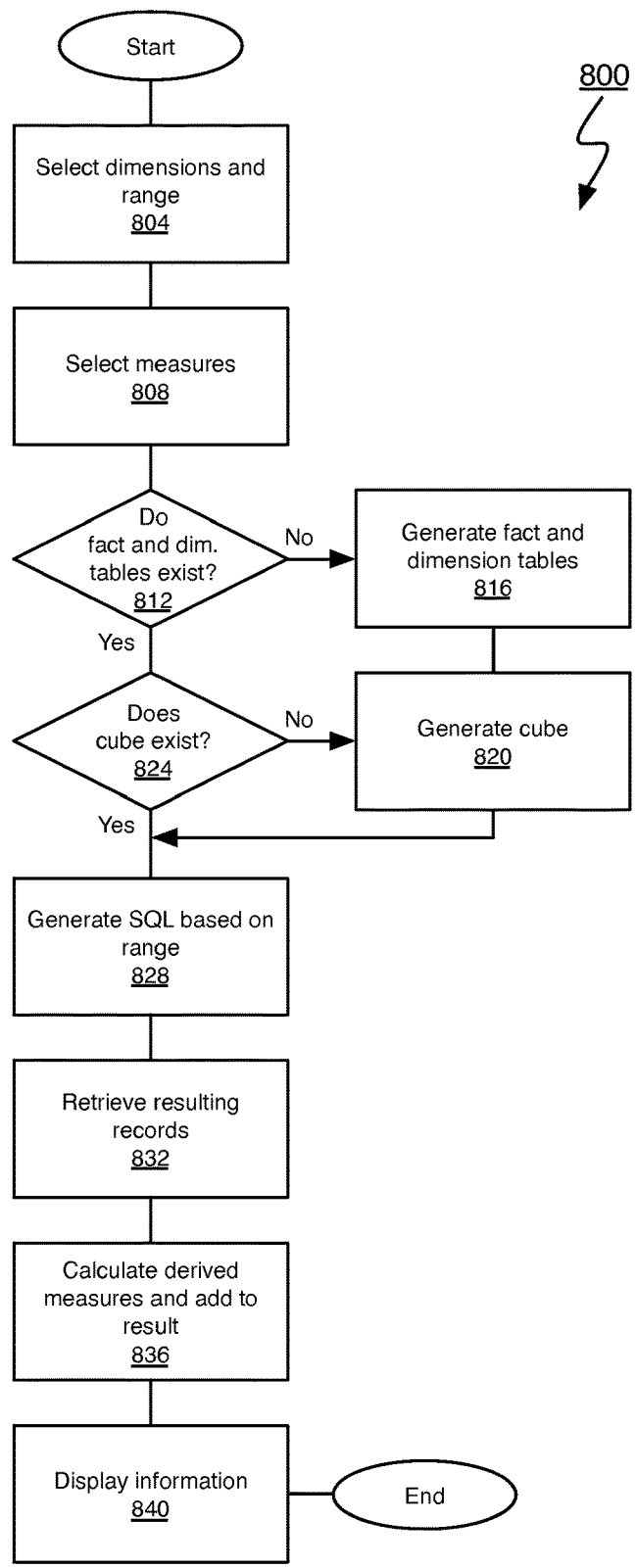
FIG. 14 is a flowchart of the method of deriving measures used by the analytics server 20 of FIG. 1.

FIG. 14 is a flowchart of the method 800 of deriving measures used by the analytics server 20. The method 800 commences with the selection of dimensions and range (804). Next, the measures are selected (808). Upon selecting the measures, it is determined if a cube matching the selected dimensions, range and measures exists (812). If it is determined that a cube matching the criteria does not exist, a cube is generated (816). Then, SQL is generated based on the range (820). Once the SQL is generated at 820, the resulting records are retrieved (824). Next, derived measures are calculated and added to the result (828). Upon calculating the derived measures, the information is transmitted to the business intelligence client 240.

In order to calculate the derived measures during runtime, Java bytecode is generated, loaded and executed directly using technology like Jasper or Janino (http://www.janino.net).

These derived measures are evaluated at runtime after the raw measures are aggregated. The derived measures are used to calculate the profit of a set of transactions after the revenue and cost of the transactions are aggregated.

There are two challenges to evaluating the derived measures at runtime. First, some measures have to be calculated by the extract, transform, and load ("ETL") process for each transaction. For example, there is a need to calculate the discount for a sales transaction whose formula is: Discount$=SalePrice×DiscountRate. The ETL process can capture the discount rate and the sales price. Since the discount rate for each transaction is different, the total discount for a set of transactions may not be determined using the runtime-derived measures after the measures for the transactions are aggregated. The only way to calculate the total discount for the group is to determine the individual discount for each transaction and sum them up.

Second, some measures have to be calculated after matching. For example, if there is a desire to calculate Tax$, whose formula is: Tax$=EBIT×Tax %. Tax % is time dependent and can be different for each transaction. EBIT is a derived measure, which depends on the measures calculated from the matched production records. This situation may not be pushed to the import process because that would mean the entire import process would have to mimic the engine model and configurations to calculate EBIT. This is thus performed at the transaction level, since Tax % cannot be aggregated. The logical spot to add this functionality in is the calculation step within the analytics engine. These types of calculations can be added as the new last step of the calculation process. Further, the calculations can depend on derived measures, which means these calculation steps depend on the evaluation of other derived measures.

To overcome these challenges, the analytics engine is enhanced to calculate derived measures during the calculation phase for each transaction. These derived measures are treated as raw measures during the runtime. If a derived measure is calculated after import but before matching, the calculated value is projected to the matched transactions during the matching phase. If a derived measure is calculated after matching, the formula can include both sales and production measures.

A new column, "EvaluationPoint", is added to the PVC_DerivedMeasure table. It can contain the follow values:

'I'—the derived measure is calculated after import but before matching for each transaction
  P—the derived measure is calculated after matching for each transaction
  R—the derived measure is calculated during the runtime
If the value of "EvaluationPoint" is NULL or the whole "EvaluationPoint" column is missing, it is treated as R and behaves the same as before.

There are three measures that control segmentation. These three measures are specified in the PVC_FunctionParameters. For example,

| FunctionID | ParameterName | ParameterValue |
|---|---|---|
| segment | SegmentM: specifies the measure for the calculation of the margin contribution | TotVarContribution |
| segment | SegmentR: specifies the measure for the rate used on the Y-axis | CMHr |
| segment | SegmentV: specifies the measure for the volume used on the X-axis | PQty |

The formula for these derived measures have to be specified in PVC_DerivedMeasure as well. For example,

| DerivedMeasureID | DerivedMeasureExpr |
|---|---|
| CMHr | TotVarContribution_PUnit * NetLbsPHr |
| PQty | EXTSalesWeight |
| TotVarContribution | Margin - DirectLaborCost - Utilities - PlantSupplies - MaintSupplies - TotDieCost - PackLabor - PackCost - OtherExpense - Freight |

The default presentation of segmentation is to use standard cumulative view with percentile of 15% and 80%. The user can change the view by using the administrative tools, which will modify the file PVC_SegmentsSetup accordingly.

The administrative tools are used to modify the PVC_SegmentsSetup. The following fields exist in the file:

| | |
|---|---|
| ABCType | Type of the Segment. 'STD' or 'FLOOR' |
| CumQtyAPct | Accumulative Volume Percentage for Region A; e.g., 80 |
| CumQtyBPct | Accumulative Volume Percentage for Region B; e.g., 15 |
| DPHPaAB | Rate (Y-axis) Percentage for Region A in 'FLOOR' segment; e.g., 20 |
| DPHPaBC | Rate (Y-axis) Percentage for Region B in 'FLOOR' segment; e.g., 80 |
| FloorValue | The calculator Floor Value in 'FLOOR' segment |
| BFloorInc | The Floor increment for Region B |
| CFloorInc | The Floor increment for Region C |
| FixedOH | The 'FixedOH' for 'FLOOR' calculator |
| Depreciation | The 'Depreciation' for 'FLOOR' calculator |
| SGA | The 'SG&A' for 'FLOOR' calculator |
| HoursPay | The 'Hours/Day' of Working Periods for 'FLOOR' calculator |
| DaysPWeek | The 'Days/Week' of Working Periods for 'FLOOR' calculator |
| WeeksPYear | The 'Weeks/Year' of Working Periods for 'FLOOR' calculator |
| ProdPer | 'Production %' for 'FLOOR' calculator |
| NumOfEquipment | 'Number of Equipment" for 'FLOOR' calculator |
| IncludeAll | This column is optional. If set to 'True', calculation of standard derivation will include the extreme data points. (Note: The extreme data points are defined as followed: The standard derivation (sigma) of the whole data set is calculated. All data that is larger than (average + 4 * sigma) or smaller than (average − 4 * sigma) are treated as extreme data points.) |

Scenarios

A scenario business intelligence application allows the user to change the measures (or derived measures) of the cube (one at a time) and examine the impact to the other measures. When this application is invoked, the data of the cube (generated as PV3_* files) is stored in memory. The updated cube information is also kept in the memory. When the scenario is saved, the most up-to-date data is saved in a table named PV4_*.

If the value of a raw measure is changed in the scenario business intelligence application, it only affects the values of the related derived measures. Since the values of the derived measures are computed during runtime, there is no extra work that the analytics engine has to do. However, if the value of a derived measure is changed, it can impact the other raw measures.

Considering the following derived measure:

labCostPerHr=Labor/Duration

The analytics engine can calculate the average labor cost using the derived measure. However, if the user would like to know what will be the impact if the labor cost is increased by 10%, the user has to make some assumptions regarding which raw measure will be kept constant.

The PVC_DerivedMeasureCallback table specifies how the raw measures will be affected if a derived measure is changed. There are 3 columns in the table

| DerivedMeasureID: the name of the derived measure whose value is changed | CallbackMeasureID: the name of the raw or derived measure whose value will be reevaluated | CallbackMeasureExpr: the expression that is used to reevalulate the CallbackMeasureID |
|---|---|---|
| labCostPerHr | Labor | labCostPerHr * Duration |

The analytics engine has the ability to model any production process consisting of multiple steps (activity), equipment (resource), and materials. The analytics engine in fact does not limit the number of steps that are involved in the process. The analytics engine employs a model that consists of materials, activities, and resources to facilitate interaction with the data via a standard BOM view.

Using the above modeling techniques, the analytics engine models the production of any product or services. Each step in the production process is in effect an activity that loads zero or more resources that consumes zero or more inbound materials and produces zero or more outbound materials. The materials can further be qualified by terms that are unique to an organization, such as "finished product", "part", etc. This is also true for the other modeling elements. Activities can be qualified as extrusion, paint, etc. Resources can be qualified as press, saw, oven, shift, employee, etc. The qualifications are referred to as attributes.

This BOM information can then be married with a sales transaction, a forecast, budget, a customer order, etc. The same can be said with a production order as well. The customer order refers to the material (or finished product) and the activity (or the last step) that is used to produce it. The activities are linked by the materials that are produced in the preceding step.

The model includes the following tables:
PVN_Material—contains the list of all materials which includes finished products, intermediate products and raw materials
PVN_MaterialBOM—contains the parent and child relationship for the materials; the quantities of the ratio have to be specified
PVN_MaterialActivity—contains the relationship of the material and its production steps; the batch size of the production step is also specified
PVN_Activity—contains the list of production steps PVN_ActivityResource—contains the relationship of a production step and the equipments that it uses; the duration or amount of the equipment that utilized can be specified PVN_Resource—contains the list of the equipment PVN_MaterialMeasure, PVN_ActivityMeasure and PVN_ResourceMeasure—contain the measures for the related costs Using the relationship specified between activities via the inbound and outbound materials, the analytics engine can determine the unit cost to produce a material. For example, FIG. 17 shows a BOM screen presented by the business intelligence client 240 for a finished product, BA_111677.

Figures 17, 18:
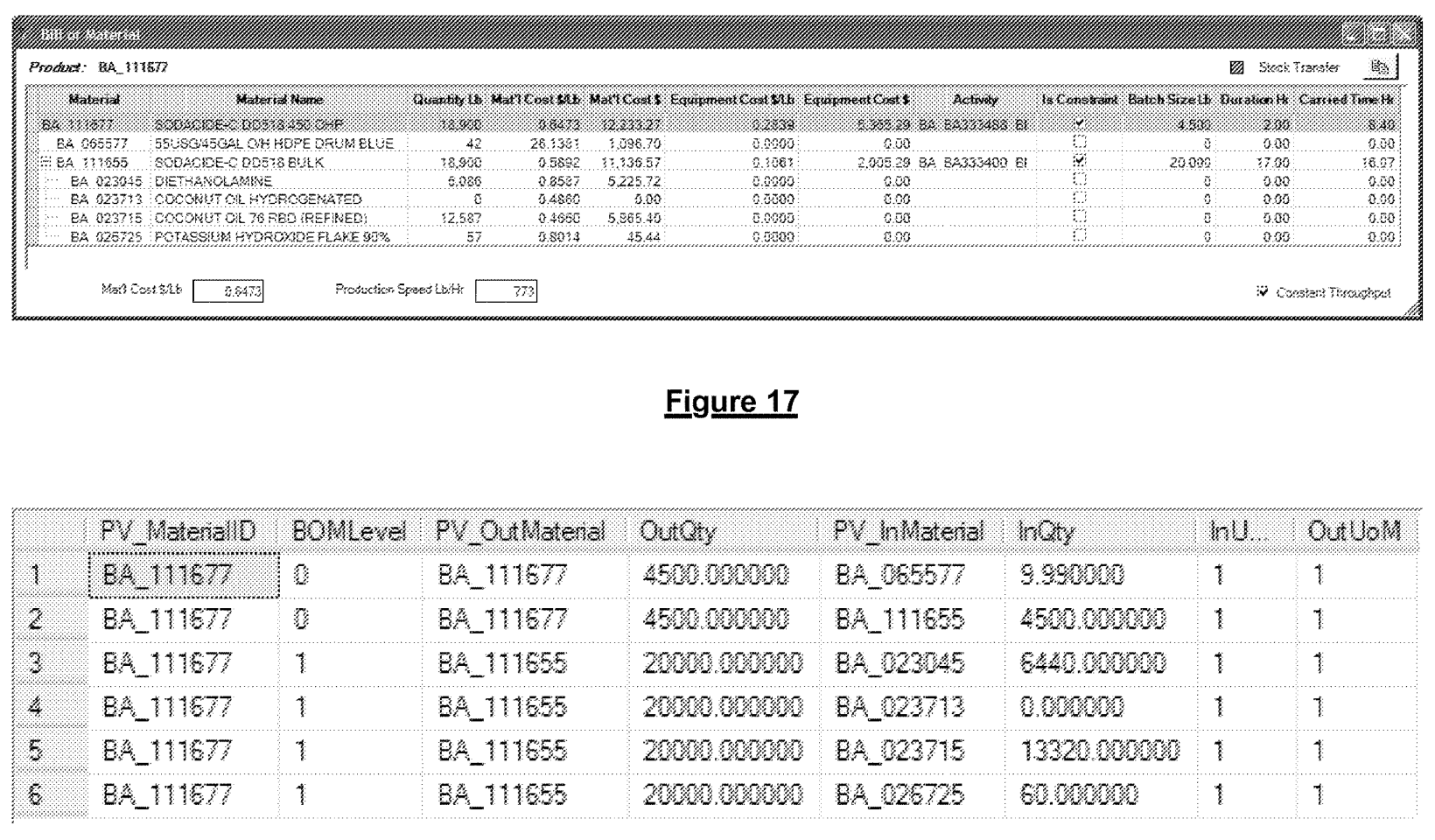

The portion of the corresponding table containing the parent and child relationships for the materials, PVN_MaterialBOM, is shown in FIG. 18. At shown, the top level (i.e., BOMLevel is 0), the PV_OutMaterial is equal to PV_MaterialID. At each level, the OutQty should be the same for the same PV_OutMaterial. If the batch size is not specified in PVN_MaterialActivity as MaterialQty, the OutQty will be used as the batch size.

FIG. 19 shows a portion of the corresponding PVN_Material table.

FIG. 20 shows a portion of the corresponding PVN_MaterialActivity table. As shown, the MaterialQty is used as a batch size.

FIG. 21 illustrates a portion of the corresponding PVN_Activity table. Here, the PVN Constraint is not used and shows a value of 0. If the duration is not specified, the activity duration is calculated using the resources that the activity used.

FIG. 22 shows a portion of the corresponding PVN_ActivityResource table. The "Duration" specifies the time that it takes to produce one batch size for the activity. The batch size is specified in PVN_MaterialActivity (MaterialQty) or PVN_MaterialBOM (OutQty) in the unit of MaterialUOM in PVN_Material. If PV_Constraint is 0, the duration of the resource used will not be added to the activity duration.

FIG. 23 illustrates a portion of the corresponding PVN_Resource table.

FIG. 24 shows a portion of the corresponding PVN_MaterialMeasure table. As can be seen, the unit raw material cost is specified. The naming convention for standard material cost is that the name starts with "S_". The Measure-Function should point to "com.pvelocity.rpm.calc.QuantityRateMeasure". The unit of measure for the unit material cost is the unit of MaterialUOM in PVN_Material.

FIG. 25 shows a portion of the corresponding PVN_ResourceMeasure table. As will be noted, the unit resource cost is specified.

FIG. 26 illustrates a portion of the corresponding PVN_MeasureFunction table. The PVN_MeasureFunction table stores the names of the functions that are used to calculate the BOM related cost.

FIG. 27 shows a BOM screen generated by the business intelligence client 240 showing material costs.

The analytics engine can calculate the unit material cost by using the following steps:
1. Store all the material costs associated with the material by looking up PVN_MaterialMeasure.
2. Calculate the unit material cost for its components recursively.
3. Total the materials costs of all components of the material using the BOM ratio specified in PVN_MaterialBOM.

The analytics engine can also determine the unit equipment cost for a material by using the following steps:

1. Check whether there is any activity associated with the material by looking up PVN_MaterialActivity.
2. Store all the activity costs associated with the material by looking up PVN_ActivityMeasure.
3. Retrieve all the resources that are used by the activity by looking up PVN_ActivityResource.
4. For each resource, calculate the equipment costs by multiplying the duration specified in PVN_ActivityResource with the resource rate specified in PVN_ResourceMeasure.
5. The equipment costs obtained from the steps above are used to produce a batch of material. The unit equipment cost will be divided by the batch size specified in PVN_MaterialActivity.

The equipment cost for the finished product can then be determined by sum up its own unit equipment cost and the equipment costs of all its components using the BOM ratio specified in PVN_MaterialBOM.

During the fact table calculation, the standard cost can be added using the following parameters in PVC_FunctionParameter:

| FunctionID | ParameterName | ParameterValue |
|---|---|---|
| calc | addBOMCostsForSales | YES |
| calc | addBOMCostsForProduction | YES |

On the production perspective, it should record the actual transaction cost.

In a scenario generated via the scenario business intelligence application, a user can change the BOM in order to simulate the following impacts:
changes in raw material cost
changes in the composition of a material
changes in equipment rate
changes in batch sizes (or yield)
switching equipment The business intelligence client 240 calculates the updated production costs and the associated profitability analysis.

In order to evaluate the impact of the changes in the BOM, "PV_MaterialID" is included in the cube as one of the "group by". If the scenario created by a user does not contain this column, the scenario business intelligence application automatically generates another scenario by adding this extra column and storing the linking in a file called PVF_StoredScenarioMaterial.

The changes in the BOM for scenarios are stored in a set of files that correspond to the files storing the BOM information. These files are:
PVS_Material
PVS_MaterialBOM
PVS_MaterialActivity
PVS_Activity
PVS_ActivityResource
PVS_Resource
PVS_MaterialMeasure, PVS_ActivityMeasure and PVS_ResourceMeasure The layouts of these files are exactly the same as the layouts for the corresponding files except the fact that there are two extra columns:
ScenarioID—this stores the name of the scenario which the changes apply to
PV_Remove—the entry is removed for the scenario The capacity display shows the duration that an equipment entity has been used for during a transaction and its associated profitability measures. This information can be invoked at the main menu, which shows the actual usage, or in a scenario, which shows the standard BOM usage. In order to show the actual usage, the PVN_ProductionMeasure is populated with actual data. In the scenario, the capacity display shows the equipment usage for standard BOM.

In the PVC_FunctionParameter, three parameters are added:

| FunctionID | ParameterName | ParameterValue |
|---|---|---|
| calc | ResourceDuration: measure for the resource duration used in the standard BOM | ResourceDuration |
| calc | TransactionResourceDuration: measure for the transaction resource duration. This data has to be supplied in the PVN_ProductionMeasure | Duration |
| calc | ProfitMeasures: measure for profitability analysis obtained by joining the PVD_TransactionResource table; the profitability of a resource is determined by all the transactions that utilize that resource | CM, CMPHr |

In the scenario business intelligence application, both raw material rate and equipment rate can be changed. In some cases, it can be convenient to group a set of materials/resources and present as a single unit to the user so that when the rate is changed, individual element within the group are updated with the single changed value. This is especially true for cases when rates are maintained in PV by periods, such as by week or month.

Material and/or resource grouping is controlled by parameters defined in the PVC_FunctionParameters table.

| FunctionID | ParameterName | ParameterValue |
|---|---|---|
| calc | RawMaterialGroupField: specifies the Material Attribute Name for Material grouping | MaterialID |

-continued

| FunctionID | ParameterName | ParameterValue |
|---|---|---|
| calc | ResourceGroupField: specifies the Resource Attribute Name for Resource grouping | PV_ResourceID |

In querying the rate for the defined group, the record associated with the largest ID is returned. It is accomplished using the SQL function MAX( ) on the ID of the group. That is, for material grouping, MAX(PV_MaterialID) is used and for resource grouping, MAX(PV_ResourceID) is used.

Computer-executable instructions for implementing the analytics engine and/or the method for providing business intelligence data on computer system could be provided separately from the computer system, for example, on a computer-readable medium (such as, for example, an optical disk, a hard disk, a USB drive or a media card) or by making them available for downloading over a communications network, such as the Internet.

While the analytics server described in the embodiment above provides business intelligence data from a single source system, those skilled in the art will appreciate that the analytics server may receive and aggregate data from two or more source systems in providing business intelligence data.

While the invention has been described with specificity to certain operating systems, the specific approach of modifying the methods described hereinabove will occur to those of skill in the art.

While the analytics server is shown as a single physical computer, it will be appreciated that the analytics server can include two or more physical computers in communication with each other. Accordingly, while the embodiment shows the various components of the server computer residing on the same physical computer, those skilled in the art will appreciate that the components can reside on separate physical computers.

The above-described embodiments are intended to be examples of the present invention and alterations and modifications may be effected thereto, by those of skill in the art, without departing from the scope of the invention that is defined solely by the claims appended hereto.

APPENDIX A

| Pseudo-code for Source Data Importation |
|---|
| Sales Record |
|     Populate the PVN_Sales using sales records from ERP. |
|     For each sales record in PVN_Sales |
|         Call routine "Add/Update BusinessPartner" for CustomerID and CustomerType |
|         Call routine "Add/Update BusinessPartner" for ShipToID and ShipToType |
|         Call routine "Add/Update SalesRep" for SalesRepID |
|         Call routine "Add/Update Material" for MaterialID using the PlantID of the sales record. |
|         Call routine "Add/Update Activity" for ActivityID using the PlantID of the sales record. |
|         For each attribute of the Sales record that is interested |
|             Check whether the AttributeID is in PVN_AttributeCategory. If not, add a record. For example, discount code: |

| AttributeID | AttrbuteName | AttributeDescription |
|---|---|---|
| discount | Discount Code | Discount Code |

APPENDIX A-continued

Pseudo-code for Source Data Importation

Add a record to PVN_SalesAttribute to store the attribute values for the SalesRep. For example, if the attribute value is a code, add a record to PVN_AttributeValueDescription to store the description of the value:

| PlantID | InvoiceID | InvoiceLine | Shipment | AttributeID | AttributeValue |
|---------|-----------|-------------|----------|-------------|----------------|
| ABC | INV00001 | 1 | 0 | discount | Summer |

```
    End-for
    Retrieve the list of resources (e.g. freight) associated with the Sales
        For each resource, call routine "Add/Update Resource"
        Add a record to PVN_SalesResource to indicate the usage.
    End-for
Production Record
    Populate the PVN_Production using production records from ERP.
    For each production record in PVN_Production
        Call routine "Add/Update Material" for MaterialID using the PlantID of the production
        record.
        For each attribute of the Production record that is interested
            Check whether the AttributeID is in PVN_AttributeCategory. If not, add a record. For
                example, production type
```

| AttributeID | AttrbuteName | AttributeDescription |
|-------------|--------------|----------------------|
| prodtype | Production Type | Production Type |

Add a record to PVN_ProductionAttribute to store the attribute values for the production. For example,

| PlantID | ProductionID | AttributeID | AttributeValue |
|---------|--------------|-------------|----------------|
| ABC | P10000 | prodtype | T1 |

```
            If the attribute value is a code, add a record to PVN_AttributeValueDescription to store
                the description of the value.
        End-for
        Call routine "Add/Update Activity" for ActivityID using the PlantID of the production
        record.
    End-for
Routine "Add/Update BusinessPartner"
    If the "PartnerID/PartnerType" in PVN_BusinessPartner does not exist or the modified date is old
        Retrieve the customer record from ERP
        Update the PVN_BusinessPartner record information
        For each customer grouping that is interested
            Check whether the PartnerGroupID is in PVN_BusinessPartnerGroupCategory. If not,
                add a record. For example, Sales Organization, Distribution Channel, Division,
                Customer Hierarchy, Market, Submarket, etc.
```

| PartnerGroupID | PartnerGroupName | PartnerGroupDescription |
|----------------|------------------|-------------------------|
| salesorg | Sales Organization | SAP Sales Organization |
| hierarchy | Customer Hierarchy | SAP Customer Hierarchy |
| market | Market Segment | Market segmentation |

Check whether the value exists in PVN_BusinessPartnerGroup. If not, add a record. For example,

| PartnerGroupID | PartnerGroupValue | PartnerGroupParent |
|----------------|-------------------|--------------------|
| salesorg | 3000 | |
| market | Electronics | |

For hierarchical grouping like "Customer Hierarchy", add its parent and all its ancestors. Add a record in PVN_BusinessPartnerGrouping

| PartnerGroupID | PartnerGroupValue | PartnerID | PartnerType |
|----------------|-------------------|-----------|-------------|
| salesorg | 3000 | 1234 | |

```
        End-for
        Call routine "Add/Update Region" for RegionID of PVN_BusinessPartner record
        Update the fields "ParentID/ParentType" according to the "PartnerType". (Note:
        ParentID/ParentType is used to model only the ship-to or bill-to relationship.)
        Update the modified date of PVN_BusinessPartner
    End-if
```

APPENDIX A-continued

Pseudo-code for Source Data Importation

Routine "Add/Update Region"
    If the "RegionID" in PVN_Region does not exist or the modified date is old
        Add a record to PVN_Region and checks its parent.
    End-if
Routine "Add/Update Sales Rep"
    If the "RepID" in PVN_SalesRep does not exist or the modified date is old
        Retrieve the sales rep record from ERP
        Update the PVN_SalesRep record information
        For each attribute of the SalesRep that is interested
            Check whether the AttributeID is in PVN_AttributeCategory. If not, add a record. For
                example, Cost Center

| AttributeID | AttrbuteName | AttributeDescription |
|---|---|---|
| costcenter | Cost Center | SAP Cost Center |

Add a record to PVN_SalesRepAttribute to store the attribute values for the SalesRep.
                For example,

| SalesRepID | AttributeID | AttributeValue |
|---|---|---|
| 7777 | costcenter | 12345 |

If the attribute value is a code, add a record to PVN_AttributeValueDescription to store
                the description of the value.
        End-for
        Retrieve the list of the regions for the sales rep
            For each of the region, call "Add/Update Region" and add a record to
                PVN_SalesRegionRep.
        Update the modified date of PVN_SalesRep
        If the sales rep has a parent, recursively call this routine for the parent
    End-if
Routine "Add/Update Material"
    If the "MaterialID" in PVN_Material does not exist or the modified date is old
        Retrieve the material (or item) record from ERP
        Update the PVN_Material record information
        For each attribute of the Material that is interested
            Check whether the AttributeID is in PVN_AttributeCategory. If not, add a record. For
                example, color, classification

| AttributeID | AttrbuteName | AttributeDescription |
|---|---|---|
| weight | Weight | Weight in Kg |
| color | Color | Color |
| classification | Product group | Product group |

Add a record to PVN_MaterialAttribute to store the attribute values for the Material. For
                example,

| PlantID | MaterialID | AttributeID | AttributeValue |
|---|---|---|---|
| ABC | PRODUCT1 | color | Red |
| ABC | PRODUCT1 | classification | Electronics |

Add a record to PVN_AttributeValueDescription if the value is a code.
        End-for
        If the material is purchased
            Retrieve the list of the suppliers (Note: the differences in the cost for using different
                suppliers are not modeled.)
            For each supplier, add a record to PVN_MaterialSupplier
        End-if
        If the material is manufactured
            Retrieve BOM for the material from ERP
            For each component, call "Add/Update Material" recursively.
            Traverse the BOM and add the records to PVN_MaterialBOM.
            Retrieve the list of activities (or recipes) for the material.
                For each activity, call routine "Add/Update Activity"
        End-if APPENDIX A-continued Pseudo-code for Source Data Importation For each type of material cost (or measure)
    Check whether the MeasureID is in PVN_MeasureCategory. If not, add a record. For example, standard cost

| MeasureID | Measure Description | Measure Type | Measure Currency | Measure CalcUOM |
|---|---|---|---|---|
| stdcost | Standard Cost | 1 | USD | kg |

Add a record to PVN_MaterialMeasure to store the cost for the material. For example,

| PlantID | MaterialID | MeasureID | Measure |
|---|---|---|---|
| ABC | PRODUCT1 | stdcost | 12.50 |

End-for
Update the modified date of PVN_Material.
End-if
Routine "Add/Update Activity"
    If the "ActivityID" in PVN_Activity does not exist or the modified date is old
        Retrieve the activity (or recipe/routing) record from ERP
        Update the PVN_Activity record information
        For each attribute of the Activity that is interested
            Check whether the AttributeID is in PVN_AttributeCategory. If not, add a record. For example, actgroup

| AttributeID | AttrbuteName | AttributeDescription |
|---|---|---|
| actgroup | Activity Group | Activity Grouping |

Add a record to PVN_ActivityAttribute to store the attribute values for the Activity. For example,

| PlantID | ActivityID | AttributeID | AttributeValue |
|---|---|---|---|
| ABC | painting | actgroup | Decoration |

Add a record to PVN_AttributeValueDescription if the value is a code.
    End-for
    For all the sub-activities (like operations in SAP), recursively call this routine "Add/Update Activity" for the sub-activities.
    Retrieve the list of resources associated with the Activity
        For each resource, call routine "Add/Update Resource"
        Add a record to PVN_ActivityResource to indicate the usage.
    Update the modified date of PVN_Activity
End-if
Routine "Add/Update Resource"
    If the "ResourceID" in PVN_Resource does not exist or the modified date is old
        Retrieve the resource record from ERP
        Update the PVN_Resource record information
        For each attribute of the Resource that is interested
            Check whether the AttributeID is in PVN_AttributeCategory. If not, add a record. For example, resource category

| AttributeID | AttrbuteName | AttributeDescription |
|---|---|---|
| Rscgroup | Resource Group | Resource Grouping |

Add a record to PVN_ResourceAttribute to store the attribute values for the Resource. For example,

| PlantID | ResourceID | AttributeID | AttributeValue |
|---|---|---|---|
| ABC | PS-10 | rscgroup | Paint Shop |

Add a record to PVN_AttributeValueDescription if the value is a code.
    End-for
    For each type of resource cost or measure (production cost)
        Check whether the MeasureID is in PVN_MeasureCategory. If not, add a record. For example, standard cost

| MeasureID | Measure Description | Measure Type | Measure Currency | Measure CalcUOM |
|---|---|---|---|---|
| paintlabor | Painting labor | 2 | USD | hr |

APPENDIX A-continued

Pseudo-code for Source Data Importation

Add a record to PVN_ResourceMeasure to store the cost for the resource. For example,

| PlantID | ResourceID | MeasureID | Measure |
|---------|------------|-----------|---------|
| ABC | PS-10 | paintlabor | 20.00 |

```
    End-for
    Update the modified date of PVN_Resource
End-if
```

APPENDIX B

Pseudo-code for Denormalization of Dimension Related Tables

```
PVND_BusinessPartner Record
    Create a new table PVND_BusinessPartner like PVN_BusinessPartner (only schema, no data)
    For each record in PVN_BusinessPartnerGroupCategory
        Add a new column to PVND_BusinessPartner using the PartnerGroupID
    End-for
    Populate the data in PVND_BusinessPartner using the left join table of PVN_BusinessPartner,
            PVN_BusinessPartnerGrouping and PVN_BusinessPartnerGroupCategory. (Note: the
            hierarchical relationship remains in PVN_BusinessPartnerGroup.)
PVND_SalesRep Record
    Create a new table PVND_SalesRep like PVN_SalesRep (only schema, no data)
    For each attribute record (AttributeID) in PVN_AttributeCategory that exists in
    PVN_SalesRepAttribute
        Add a new column to PVND_SalesRep using the AttributeID
    End-for
    Populate the data in PVND_SalesRep using the left join table of PVN_SalesRep,
            PVN_SalesRepAttribute and PVN_AttributeCategory.
Use the similar algorithm of PVND_SalesRep to generate PVND_Material, PVND_Resource,
        PVND_Activity.
```

APPENDIX C

Pseudo-code for Measure Calculation Process

```
Routine "Calculate Measure"
    For each PVN_Production record
        Call "Calculate Material Measure" for the MaterialID
        Call "Calculate Activity Measure" for the ActivityID
        Calculate the Production measures using PVN_ProductionMeasure and add them to
                PVF_Facts.
        Use the Matching Algorithm to locate one or more PVN_Sales records.
            Calculate the sales measures of PVN_Production using the weighted average of
                    PVN_Sales records.
    End-for
    For each PVN_Sales record
        For each PVN_SalesResource that belongs to this PVN_Sales
            For each PVN_ResourceMeasure that belongs to the resource
                Calculate the amount by using "Measure", "Duration", "MaterialQty", etc. . . (Note:
                    this calculation will be MeasureType dependent.)
                Add a record to PVF_Facts.
            End-for
        End-for
        Calculate the Saleas Measures using PVN_SalesMeasure and add them to PVF_Facts.
        Use the Matching Algorithm to locate the PVN_Production record.
            Calculate the production measures of PVN_Sales using the weighted average of
                    PVN_Production records.
            Call "Calculate Activity Measure" for the ActivityID using the MaterialID and
                    MaterialQty
    End-for
Routine "Calculate Material Measure"
    For each PVN_MaterialMeasure record that belongs to
        Calculate the amount
        Add a record to PVF_Facts.
    End-for
    Use PVN_MaterialBOM to retrieve the first level of components.
        For each component, recursively call "Calculate Material Measure".
```

APPENDIX C-continued

Pseudo-code for Measure Calculation Process

```
Use PVN_MaterialActivity to retrieve all the activities that can produce the material.
    For each activity, call "Calculate Activity Measure".
    Add a record to PVF_Facts (with EntityType set to 1) where
        Amount = average(?) of activity cost + sum of the components cost. (Note: this amount is
            used only if standard cost is not available).
Routine "Calculate Activity Measure" for MaterialID, MaterialQty
    For each PVN_ActivityResource that belongs to this PVN_Activity
        For each PVN_ResourceMeasure that belongs to the resource
            Calculate the amount by using "Measure", "Duration", "MaterialQty", etc. . . (Note: this
                calculation will be MeasureType dependent.)
            Add a record to PVF_Facts.
        End-for
    End-for
    For each sub-activity,
        recursively call "Calculate Activity Measure".
        Add a record to PVF_Facts.
    End-for
```

The invention claimed is:

1. A system for improved efficiency in the retrieval of business intelligence data used in data mining, the system comprising:
    an analytics server including a computer readable medium having a data file stored thereon, said data file consisting of source data aggregated from one or more data sources;
    wherein said analytics server includes computer readable instructions stored on said computer readable medium for:
        normalizing the source data to produce normalized data;
        generating one or more dimensions from said source data, wherein said one or more dimensions define categories into which portions of said normalized data can be grouped in a snowflake schema;
        generating one or more measures for each component used in producing an end product from said source data linked to said one or more dimensions in said snowflake schema; said measures comprising rate measures, allocation measures, and hierarchical structure measures;
        storing said one or more dimensions and said one or more measures in a plurality of tables arranged in a star schema;
        determining relationship information between said one or more measures and said one or more dimensions in each of said plurality of tables;
        filtering said plurality of tables to generate a plurality of independent fact tables and adding said independent fact tables to a fact table pool; each of said plurality of independent fact tables selected from a category fact table, a time aggregated fact table, and a generalized fact table;
        generating, from the normalized data, a master facts table containing data for two or more categories;
        generating into the pool, a plurality of baby fact tables, each comprising a subset of the master facts table;
        generating a plurality of cubes from the baby fact tables, the cubes aggregating data in the baby fact tables by at least one of the categories;
        aggregating data in the baby fact tables by at least one of the categories;
        receiving a query;
        upon receiving the query, searching for the most specific baby fact table available in the pool to satisfy the query;
        failing to find the most specific baby fact table;
        upon said failing to find the most specific baby fact table, recording a miss, creating a new cube and recording the cube creation time for the new cube; and
        based on said recording of the miss, pre-generating the most specific baby fact table for use in subsequent queries, wherein, the cube creation time using baby fact tables is smaller than the cube creation time using the master fact tables, thereby speeding up the generation of the cubes;
        creating additional independent fact tables based on said pool statistics and adding said additional independent fact tables to said fact table pool;
        determining a plurality of relationships between each component and said end product and storing said relationships in each of said plurality of tables;
        each relationship comprises a cost relationship as a percentage of a total cost required to produce said end product;
        storing said relationship information on said computer readable medium;
        calculating a total cost of at least one product based on said cost relationship information;
    one or more computing devices in communication with said analytics server, and including a module stored on a further computer readable medium having instructions thereon for:
        submitting said at least one query and receiving data from said most specific fact table from said analytics server;
        wherein said at least one query comprises querying for the change in total cost of said at least one product based on a change in any one of said measures;
        and wherein a clustered index of each of said independent fact tables is cached in memory for faster query processing.

2. The system according to claim 1, wherein said step of determining relationship information comprises determining relationship information between any one of said one or more measures and an additional any one of said one or more measures selected from said one or more measures linked to the same dimension.

3. The system according to claim 1, wherein said step of determining relationship information comprises determining relationship information between any one of said one or more measures and an additional any one of said one or more measures selected from one or more measures linked to a different dimension.

4. The system according to claim 1, wherein said relationship information includes each said costs, and said computer readable instructions further include storing said costs in a costs table.

5. The system according to claim 4, wherein said computer readable instructions further includes instructions for responding to a query by said one or more computing devices by determining a total product cost based on an identified change in one or more measures and said percentage of said total cost as stored in said costs table.

6. A computer implemented method for improving efficiency and retrieval of business intelligence data used in data mining comprising:
 normalizing the source data to produce normalized data;
 generating by an analytics server one or more dimensions from source data imported from a computer readable medium, wherein said one or more dimensions define categories into which portions of said normalized data can be grouped in a snowflake schema;
 generating by said analytics server one or more measures for each component used in producing an end product from said source data linked to said one or more dimensions in said snowflake schema; said measures comprising rate measures, allocation measures, and hierarchical structure measures;
 storing by said analytics server said one or more dimensions and said one or more measures in a plurality of tables arranged in a star schema;
 determining by said analytics server relationship information between said one or more measures and said one or more dimensions in each of said plurality of tables;
 filtering said plurality of tables to generate a plurality of independent fact tables and adding said independent fact tables to a fact table pool; each of said plurality of independent fact tables selected from a category fact table, a time aggregated fact table, and a generalized fact table;
 generating, from the normalized data, a master facts table containing data for two or more categories;
 generating into the pool, a plurality of baby fact tables, each comprising a subset of the master facts table;
 generating a plurality of cubes from the baby fact tables, the cubes aggregating data in the baby fact tables by at least one of the categories;
 aggregating data in the baby fact tables by at least one of the categories;
 receiving a query;
 upon receiving the query, searching for the most specific baby fact table available in the pool to satisfy the query;
 failing to find the most specific baby fact table;
 upon said failing to find the most specific baby fact table, recording a miss, creating a new cube and recording the cube creation time for the new cube; and
 based on said recording of the miss, pre-generating the most specific baby fact table for use in subsequent queries, wherein, the cube creation time using baby fact tables is smaller than the cube creation time using the master fact tables, thereby speeding up the generation of the cubes;
 creating additional independent fact tables based on said pool statistics and adding said additional independent fact tables to said fact table pool;
 determining a plurality of relationships between each component and said end product and storing said relationships in each of said plurality of tables;
 each relationship comprises a cost relationship as a percentage of a total cost required to produce said end product;
 storing by said analytics server said relationship information on said computer readable medium;
 calculating by said analytics server a total cost of at least one product based on said cost relationship information;
 submitting said at least one query by a computer system in communication with said analytics server for the change in total cost of said at least one product based on said most specific fact table; and
 caching a clustered index of each of said independent fact tables in memory for faster query processing.

7. The method according to claim 6, wherein said step of determining relationship information comprises determining relationship information between any one of said one or more measures and an additional any one of said one or more measures selected from said one or more measures linked to the same dimension.

8. The method according to claim 6, wherein said step of determining relationship information comprises determining relationship information between any one of said one or more measures and an additional any one of said one or more measures selected from one or more measures linked to a different dimension.

9. The method according to claim 6, wherein said relationship information includes each said costs, and said computer readable instructions further include storing said costs in a costs table.

10. The method according to claim 4, further comprising responding by said analytics server to a query by said one or more computing devices by determining a total product cost based on an identified change in one or more measures and said percentage of said total cost as stored in said costs table.

* * * * *